(12) United States Patent
Shar et al.

(10) Patent No.: US 12,655,309 B2
(45) Date of Patent: Jun. 16, 2026

(54) 3D-PRINTABLE ONE-PART CARBON PARTICLE ELASTOMER INK FOR APPLICATIONS SUCH AS HEALTH MONITORING

(71) Applicant: Virginia Commonwealth University, Richmond, VA (US)

(72) Inventors: Andy Shar, Richmond, VA (US); Philip Glass, Richmond, VA (US); Daeha Joung, Richmond, VA (US)

(73) Assignee: Virginia Commonwealth University, Richmond, VA (US)

( * ) Notice: Subject to any disclaimer, the term of this patent is extended or adjusted under 35 U.S.C. 154(b) by 180 days.

(21) Appl. No.: 18/471,451

(22) Filed: Sep. 21, 2023

(65) Prior Publication Data

US 2024/0093045 A1     Mar. 21, 2024

Related U.S. Application Data

(60) Provisional application No. 63/408,700, filed on Sep. 21, 2022.

(51) Int. Cl.

| | |
|---|---|
| *C09D 7/61* | (2018.01) |
| *B29C 64/106* | (2017.01) |
| *B29C 64/118* | (2017.01) |
| *B29K 83/00* | (2006.01) |
| *B29K 105/16* | (2006.01) |
| *B29K 507/04* | (2006.01) |
| *B33Y 10/00* | (2015.01) |
| *B33Y 40/10* | (2020.01) |
| *B33Y 70/00* | (2020.01) |
| *B33Y 70/10* | (2020.01) |
| *C08L 83/04* | (2006.01) |
| *C09D 7/65* | (2018.01) |
| *C09D 7/80* | (2018.01) |
| *C09D 17/00* | (2006.01) |
| *C09D 183/04* | (2006.01) |

(52) U.S. Cl.
CPC .............. *C09D 7/61* (2018.01); *B29C 64/106* (2017.08); *B33Y 10/00* (2014.12); *B33Y 40/10* (2020.01); *B33Y 70/00* (2014.12); *B33Y 70/10* (2020.01); *C08L 83/04* (2013.01); *C09D 7/65* (2018.01); *C09D 7/80* (2018.01); *C09D 17/002* (2013.01); *C09D 17/004* (2013.01); *C09D 183/04* (2013.01); *B29C 64/118* (2017.08); *B29K 2083/00* (2013.01); *B29K 2105/162* (2013.01); *B29K 2507/04* (2013.01)

(58) Field of Classification Search
CPC .......... C09D 7/61; C09D 183/04; C09D 7/65; C09D 17/002; C09D 17/004; C09D 7/80; C08L 83/04; B33Y 10/00; B33Y 40/10; B33Y 70/10; B33Y 70/00; B29C 64/106; B29C 64/118; B29K 2083/00; B29K 2105/162; B29K 2507/04
See application file for complete search history.

(56) References Cited

U.S. PATENT DOCUMENTS

| | | | | |
|---|---|---|---|---|
| 4,670,351 A * | 6/1987 | Keane | .................... | H05K 3/246 |
| | | | | 361/779 |
| 2013/0101835 A1* | 4/2013 | Park | ........................ | C08L 83/00 |
| | | | | 977/773 |
| 2017/0369660 A1* | 12/2017 | Ata | ........................... | C08J 5/005 |
| 2018/0037997 A1* | 2/2018 | Murase | ................... | C22C 45/04 |

FOREIGN PATENT DOCUMENTS

| | | | | |
|---|---|---|---|---|
| CN | 110330794 A | * 10/2019 | ............... | C08K 3/36 |
| JP | 2015036752 A | * 2/2015 | | |

OTHER PUBLICATIONS

Lim et al., "Experimental Consideration of the Hansen Solubility Parameters of As-Produced Multi-Walled Carbon Nanotubes by Inverse Gas Chromatography", Phys. Chem. Chem. Phys, 2014, 16, pp. 17466-17472.*
Jalan et al., "Using Solubility Parameters to Model More Environmentally Friendly Solvent Blends for Organic Solar Cell Active Layers", Materials, 12(23), (2019), pp. 1-13.*
Machine English translation of JP 2015-036752, Ida, Feb. 23, 2015.*
Machine English translation of CN 110330794, Xu, Oct. 15, 2019.*

* cited by examiner

*Primary Examiner* — Patrick D Niland
(74) *Attorney, Agent, or Firm* — WCF IP

(57) ABSTRACT

3D printable inks are disclosed which include one-part room temperature vulcanized (RTV) silicone and carbon particles such as carbon nanotubes (CNTs). Butyl acetate may be used as a solvent to disperse the CNTs in the silicone in the ink precursor. The one-part nature of the inks (i) enables to print without prior mixing and cures under ambient conditions; (ii) allows directly dispensing 100 μm resolution printability on nonpolar and polar substrates; and (iii) forms both self-supporting and high-aspect-ratio structures, key aspects in additive biomanufacturing that eliminate the need for sacrificial layers; and (iv) lends efficient, reproducible, and highly sensitive responses to various tensile and compressive stimuli. The high electrical and thermal conductivity of the CNT-silicone composite is further extended to facilitate use as a flexible and stretchable heating element, with applications in body temperature regulation, water distillation, and a dual temperature sensor and Joule heating source, for example.

16 Claims, 20 Drawing Sheets

3D-PRINTABLE ONE-PART CARBON PARTICLE ELASTOMER INK FOR APPLICATIONS SUCH AS HEALTH MONITORING

CROSS-REFERENCE TO RELATED APPLICATION

This application claims the benefit of U.S. Provisional Patent App. No. 63/408,700, filed Sep. 21, 2022, the complete contents of which are herein incorporated by reference.

FIELD OF THE INVENTION

Embodiments generally relate to elastomeric inks and, more particularly, elastomeric inks and related methods for applications such as but not limited to health monitoring.

BACKGROUND

Conductive elastomer nanocomposites have greatly interested the biomedical devices community in recent years. Due to its flexibility and biocompatibility, silicone is a highly desirable material biologically not just for applications in contact with human skin, but also for scaffolds for tissue regeneration.

When infused with conductive nanomaterials, silicone offers a flexible, moldable, and inert substrate for applications such as biosensors, energy harvesting devices, and electronic skin.

An attractive platform for manufacturing devices with these conductive and flexible bio-nanocomposites is direct ink writing or extrusion-based 3D printing. 3D printing has become a versatile method of creating extraordinarily detailed and customized structures that are both biocompatible and free-standing. These 3D printed devices can be tailored to be patient-specific in their conformation to the shape and size of specific physiological features, which can vary from patient to patient. Requirements may even vary depending on where on a single body the 3D printed device is placed. Silicone based devices can be utilized in increasingly specific health and biomonitoring applications.

Within this subfield of 3D printing, there is a growing need for conductive, biocompatible 3D printable inks usable towards devices, culture platforms, and treatment methods. For example, conductivity in 3D printed scaffolds has been shown to induce growth of neuronal stem cells and cardiac tissue. As the human body is innately an environment of charges and ions, a conductive 3D printable ink is key to forming patient-tailored scaffolds for optimal tissue regeneration and growth. Devices to monitor cardiac health, blood pressure, blood sugar, and beyond are also well suited to the mutability and customizability of 3D printing inks.

There are issues in synthesizing current conductive and stretchable elastomer inks and their ability to fabricate devices for biomedicine and beyond. Many existing inks are fabricated through a solvent-mixing process that utilizes environmentally or physiologically harmful solvents. Other existing inks rely on fabrication processes that employ thermal heating over a long period of time and UV irradiation, which limits the applications of the inks.

Two-part silicone or polydimethylsiloxane (PDMS)-based inks require prior mixing or other preparation for curing sufficiently. When printing large-scale or detailed structures, this can pose a problem as either the ink prematurely cures before the print is complete, or it partially cures during printing and impedes the consistent flow of ink at a constant pressure. Two-part PDMS inks are therefore undesirably limited with respect to working time.

Carbon nanotubes (CNTs), both single-walled and multi-walled, are characteristically hard to disperse within polymer matrices owing to the propensity of CNTs to aggregate. Isopropyl alcohol (IPA) has been used as a co-solvent for CNT and two-part PDMS. However, the method requires driving off the IPA through heating over several hours during the preparation. For one-part PDMS, IPA is not as effective at solvating one-part acetoxy or alkoxy silicones. Dichloromethane (DCM) also has drawbacks. Mixing of CNT and alkoxy silicones in DCM resulted in non-uniform distribution of CNTs in silicone and fast curing of alkoxy silicone, hence lower printability. Also, the process is environmentally toxic.

SUMMARY

According to some embodiments, a one-part humidity curing mechanism via a chemical reaction between the atmospheric humidity and the silicone makes the ink easier to handle than previous two-parts PDMS based conducting inks, including (1) the use of non-toxic butyl acetate (BA) as a common solvent and short preparation process (e.g., within one hour); (2) extended lifetime within the 3D printing syringe; (3) a room-temperature route from synthesis, printing, to curing without prior mixing; (4) ability to 3D printing self-supporting structure without supporting/sacrificial materials; and (5) capability with printing on various polar and nonpolar surfaces ranging from glass to latex. The ink is well-suited for 3D printing biomedical applications because it can form freestanding, flexible, stretchable structures with a high aspect ratio with 100 $\mu$m resolution and electrical (e.g., up to ~7 S/m with 10% CNT concentration) and thermal (e.g., boil away water within seconds) conductivities. For biosensing and health monitoring applications, an exemplary 3D printing ink may be used to make customizable Joule heating devices, temperature detectors, and wearable tactile and e-skin sensors for motion detectors of various organs' pressure responses. Some exemplary devices may interface directly with human organs for regeneration and repair, as the sensing ink in biomonitoring devices, tactile sensors, and even the fundamental material in flexible biomimetic cell culture platforms.

An aspect of some embodiments is a one-part, conductive, and flexible carbon particle-silicone ink. The carbon particles may be carbon nanotubes (CNT). The ink is 3D printable.

An aspect of some embodiments is an inexpensive, room temperature method for manufacturing a one-part, conductive, and flexible CNT-silicone ink. A one-part humidity curing mechanism via the chemical reaction between atmospheric humidity and polydimethylsiloxane (PDMS) makes the ink easier to handle than current two-part PDMS inks and offers the advantage of extended lifetime within the 3D-printing syringe.

An exemplary ink may be kept within a tightly sealed syringe or other storage container for days without sacrificing printability. An exemplary manufacturing process provides a room-temperature route to fabrication of the ink. The entire fabrication process can be completed within an hour at room temperature and can be scaled appropriately to yield large quantities of ink in a short amount of time.

Butyl acetate may be used as a common solvent for CNT and one-part room temperature vulcanized (RTV) silicone, e.g., alkoxy-cure silicone. This solvent allows for a non-toxic, bio-sourced route to CNT dispersion. The alkoxy-cure silicone can be easily printed on various polar and nonpolar substrates ranging from glass to latex, for example.

Exemplary inks are well-suited for biomedical applications. Exemplary inks easily form freestanding structures with high aspect ratio, e.g., print at ultra-high resolution (at least as small as 100 μm). Exemplary inks are highly flexible. This property enables complex 3D patient-customized structures which can be built without the need for molds. Finally, the printing process occurs at room temperature without the need for a heat cure, opening opportunities for cell incorporation into 3D printed scaffolds. Thus, this ink can be used to create structures that interface directly with human organs (bones, heart, spinal cord, peripheral nerves, etc.) for tissue regeneration and repair, as the sensing ink in biomonitoring devices, in tactile sensors, and even as the fundamental material in flexible biomimetic cell culture platforms.

Exemplary embodiments may include Joule heating devices and Joule heating applications. Joule heating devices may be made using exemplary conductive nano-composites/inks according to this disclosure. Joule heating has widespread applications commercially, from personal or medical regulation of body temperature to military use in body armor and industrial use in heaters and stoves. Some embodiments may comprise a flexible device used for Joule heating. For example, military vests which contain a flexible yet conductive material benefit by allowing the material to be worn over the body's contour, distributing heat evenly. Flexible Joule heating devices may also find use in heating pads for injuries, thermoregulation, and survival equipment. Exemplary Joule heating devices may be configured for water distillation and purification as well. Widespread yet life-threatening conditions ranging from hypoventilation to bradycardia to hypertension to cancerous tumors may all be detected or treated via exemplary CNT-silicone ink-based devices. Moreover, given the facile nature of transferring patient data to gantry-processable G Code, patient-customized designs are easily printed.

According to some embodiments, an ink precursor comprises uncured one-part room temperature vulcanized (RTV) silicone and carbon particles such as carbon nanotubes (CNT) dissolved in butyl acetate (BA). The RTV silicone and CNT may form a homogeneous dispersion. The one-part RTV silicone may be polydimethylsiloxane (PDMS). The ink precursor may further comprise one or more viscosity reducers. An exemplary viscosity reducer is methyl-terminated polydimethylsiloxane (MEP). The ratio of BA:silicone may be at least 50:100% w/w.

According to some embodiments, an ink is produced from an ink precursor like that described in the preceding paragraph. The solvent may be removed from the ink precursor, e.g., by evaporation, to produce the ink. An ink for 3D printing may comprise a homogenous mixture of uncured one-part room temperature vulcanized (RTV) silicone and carbon nanotubes (CNT). The ink may be solvent free. The ink may be free of any volatiles. The ink may comprise one or more viscosity reducers such as methyl-terminated polydimethylsiloxane (MEP). The ink may have at most a 15:100% w/w ratio of MEP:silicone. The one-part RTV silicone may be polydimethylsiloxane (PDMS). The ink may desirably have a working time greater than 30 minutes or greater than two hours. The ink may have a printing resolution of at least 100 μm or smaller.

According to some embodiments, a method of producing an ink for 3D printing may comprise: mixing carbon particles such as carbon nanotubes (CNT) with a first quantity of butyl acetate (BA) to form a CNT-BA slurry; mixing a second quantity of BA, uncured one-part room temperature vulcanized (RTV) silicone, and methyl-terminated polydimethylsiloxane (MEP) to form a first homogenous dispersion; mixing the CNT-BA slurry and first homogenous dispersion to form a second homogenous dispersion; and evaporating the BA from the second homogenous dispersion to form the ink.

According to some embodiments, a method of producing a three-dimensional object may comprise ejecting or extruding an ink comprising uncured one-part RTV silicone and carbon particles such as carbon nanotubes (CNT) in the presence of airborne moisture; and humidity curing the ink. The ejecting or extruding step may be through a 150 μm or smaller inner diameter tip. The ejecting or extruding step may be through a 100 μm or smaller inner diameter tip. The ejecting or extruding step may be performed at a constant pressure for over two hours. The method may be performed without sacrificial supporting materials.

DETAILED DESCRIPTION

Figure 1:
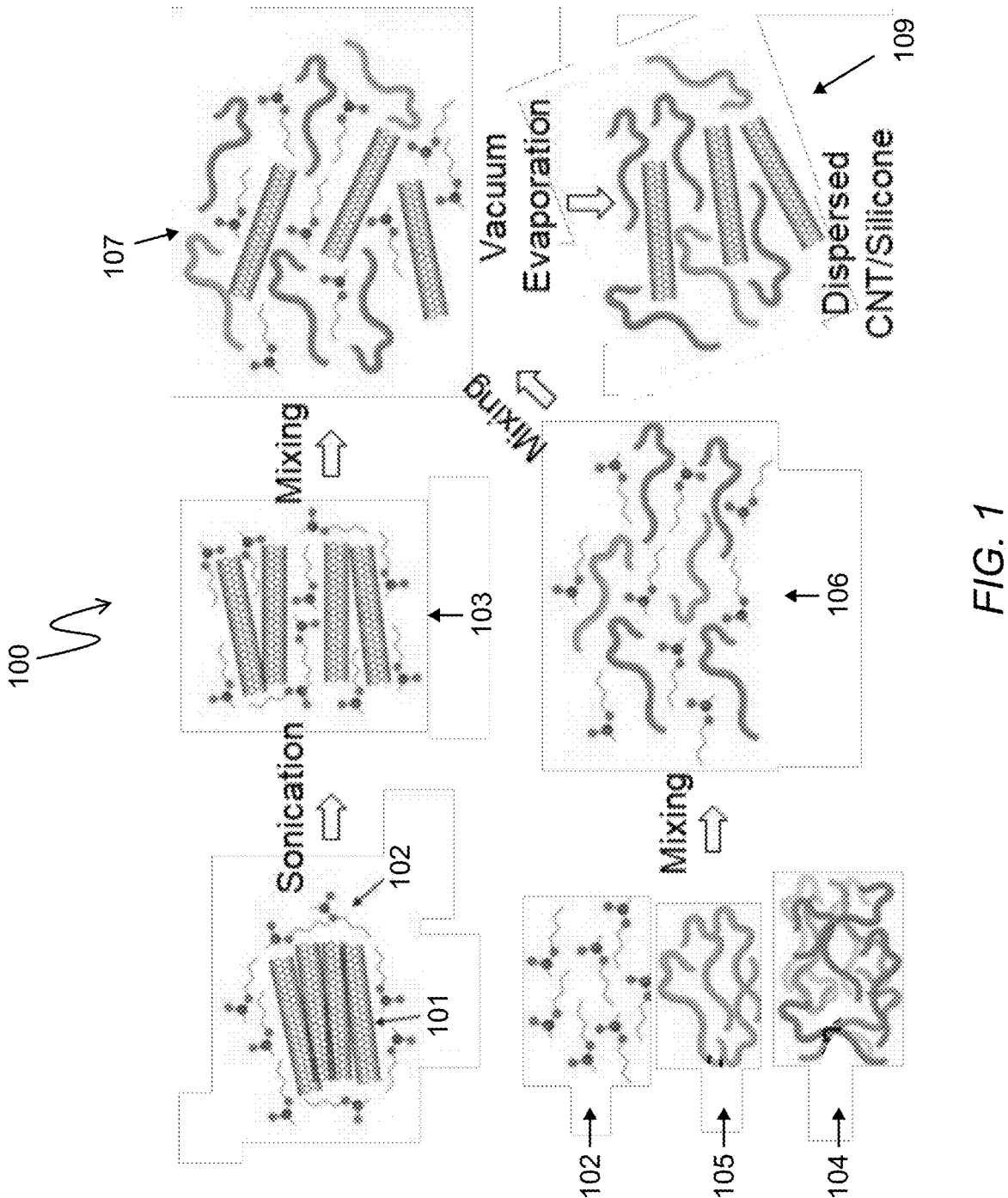
FIG. 1 is a schematic of fabrication of an exemplary homogenous CNT-silicone composite.

FIG. 1 illustrates an exemplary process 100 for making an exemplary composite 109 usable as an ink, for example. For purposes of this disclosure, "composite", "nanocomposite", "ink", and "material" may generally be used interchangeably to refer to exemplary compositions.

According to exemplary process 100, carbon particles such as carbon nanotubes 101 (CNT) are mixed with butyl acetate 102 (BA) and sonicated to form a CNT-BA slurry 103. In a separate (e.g., parallel) procedure, a separate mixture is prepared. Butyl acetate 102, an uncured one-part room temperature vulcanized (RTV) silicone 104, and methyl-terminated polydimethylsiloxane 105 (methyl-terminated PDMS; MEP) are combined and mixed until the dispersion is homogenous. The resulting homogenous dispersion 106 of BA/MEP/silicone is then added to the CNT-BA slurry 103 and mixed until homogeneity is achieved. The resulting ink precursor mixture 107 is a viscous liquid comprising or composed of CNT 101, butyl acetate 102, MEP 105, and one-part RTV silicone 104 in a homogenous dispersion. All the butyl acetate is then evaporated from the mixture 107, e.g., by vacuum evaporation. The final composite 109 is an ink ready to use for 3D printing applications. The composite 109 may be stored for an extended period prior to use.

Exemplary inks comprise one or more silicones, also known as polysiloxanes. Silicones are polymers consisting of a silicon-oxygen backbone with organic groups, typically methyl groups, attached to the silicon atoms. Certain organic side groups may be used to link two or more chains together. An exemplary silicone for composites of this disclosure is polydimethylsiloxane, called PDMS or dimethicone. PDMS has the chemical formula $(C_2H_6OSi)_n$. Silicones may be either one-part (one component) or two-part (two component). A one-part silicone consists of a base without a curative. Atmospheric moisture facilitates curing. A two-part silicone consists of a base and a curative. The curative may be, for example, a cross-linker such as active alkoxy, acetoxy, amine, octoate, and ketoxime. RTV silicone is a type of silicone that cures at room temperature. One-part RTV silicone is a polymer with an altering Si—O backbone. This backbone can function as both non-polar and polar in different orientations; this results in many solvents being unable to efficiently dissolve or swell one-part RTV silicone.

In exemplary embodiments the silicone used in exemplary composites is a one-part silicone, not a two-part silicone. A one-part ink, which is to say an ink in which the silicone component is mostly or exclusively one-part silicone, possesses many advantages over traditional two-part inks, especially for applications such as creating detailed, large, and biocompatible structures. For example, aside from necessitating an extra mixing step, most two-part silicones or epoxies (platinum-based silicones rely on transition metal-catalyzed curing mechanisms) have undesirably short working times (e.g., ≤30 min). This may lead to spontaneous curing within the syringe before completing a detailed 3D print.

In contrast to two-part inks, an exemplary one-part CNT-silicone ink has a working time greater than 30 minutes. Indeed, many exemplary formulations may have working times far in excess of 30 minutes. For instance, the working time of exemplary inks may be at least one hour, at least two hours, more than two hours, at least a day, or multiple days (e.g., at least 72 hours). An exemplary one-part ink may continuously print for over two hours without needing to increase printing pressure. In addition, a one-part ink is capable of being stored indefinitely if adequately sealed (no environmental moisture is permitted to enter the storage container after the storage container is closed). An exemplary silicone is an alkoxy-cure RTV silicone.

The exemplary process 100 of FIG. 1 employs a solvent such as BA to advantageously avoid a need for high temperatures. The amount of BA may have a minimum of 100:50% w/w ratio of silicone:BA in the ink precursor mixture. BA is a relatively volatile solvent that evaporates homogenously and quickly without a need for high temperatures. Room temperature, for example, provides sufficiently expeditious removal of BA by evaporation. The entire fabrication process 100 for producing an exemplary ink can be completed within one hour, significantly speeding up the ink preparation compared to the state of the art.

The CNT concentration in solvent may be selected according to desired conductivity of the ink being produced. For instance, in some embodiments the CNT concentration may be at least 9 mg/mL solvent, or at least 10 mg/mL solvent, to achieve a high conductivity.

The solubility parameters of CNT are estimated to be near 19.7 (dispersive), 6.2 (polar), and 4.2 (hydrogen bonding components). The solubility parameters of uncured PDMS are estimated to be 14.81 (dispersive), 2.31 (polar), and 2.35 (hydrogen bonding components). With this discrepancy in the dispersive components holding CNT (19.7) and PDMS (14.81) molecules, it becomes difficult to find a solvent that can disperse or dissolve both components. BA is an exemplary solvent that meets the necessary criteria for mixing of CNT and uncured one-part RTV silicone to form a homogeneous mixture.

Carbon particles in accordance with this disclosure include carbon nanofibers and carbon nanotubes, which typically have widths of 1000 nm or less. A carbon nanotube (CNT) may be characterized as a substance of a hollow structure measuring about 0.7 to 100 nm in diameter and about several μm to about several tens of mm in length, in which a single wall or multi wall graphene sheet of carbon atoms arranged in a hexagonal network is rounded in a cylindrical shape. A carbon nanotube has not only excellent thermal and chemical stabilities as well as mechanical strength, but also properties which vary depending on the way of winding and the thickness of a tube.

Carbon nanotubes (CNT) have very high thermal conductivity of, e.g., >2000 W/mK. Carbon nanotubes are particles that may be understood to comprise molecular carbon that is predominantly in sp2 hybridized form (i.e., structures in which the carbons atoms are predominantly connected to three other carbon atoms within a lattice structure, sometimes referred to as a "grapheme carbon lattice"). For example, while graphite molecules contain planar sheets of sp2 hybridized carbon, carbon nanotubes have been described as curved sheets of sp2 hybridized carbon in the form of hollow tubes. Carbon nanotubes may thus be thought of as one or more sheets of graphite that are shaped into tubes. CNTs may be made by directing a laser at a graphite surface, causing some of the sheets to be displaced from the graphite, which subsequently react to form nanotubes. Specific examples of nanotubes include single-wall carbon nanotubes (SWCNTs) and multi-wall carbon nanotubes (MWCNTs) (i.e., nanotubes having walls that are two or more carbon layers thick). SWCNTs have typical inner diameters ranging from 0.25 nm to 0.5 nm to 1 nm to 2.5 nm to 5 nm, and typical lengths up to 100 micron or more, for example, lengths ranging from 10 nm to 100 nm to 1 micron to 10 microns to 100 microns or more. MWCNTs have typical inner diameters ranging from 2.5 nm to 5 nm to 10 nm, outer diameters of 5 nm to 10 nm to 25 nm to 50 nm, and typically lengths up to 100 microns or more, for example, lengths ranging from 10 nm to 100 nm to 1 micron to 10 microns to 100 microns or more.

Inks intended for direct ink writing applications may have one or more additional components tailored to this intended application. In some embodiments, a viscosity reducer may be used to thin the PDMS mixture to decrease the viscosity of the ink and make it adhere well to itself and substrates and extrude better from small tips. An exemplary viscosity reducer is methyl-terminated polydimethylsiloxane (MEP). Inks may exclude MEP for increased viscosity or include MEP for reduced viscosity. For formulations which include MEP, the amount of MEP may be limited to a 15:100% w/w ratio of MEP:silicone, or less. Higher amounts of MEP relative to the amount of silicone may prevent the silicone nanocomposite from curing satisfactorily.

Exemplary inks exhibit substrate versatility. For instance, exemplary inks are directly printable onto both polar and non-polar substrates. Exemplary methods may print such inks on a polar substrate, nonpolar substrate, or both polar and nonpolar substrates. Suitable substrates include but are not limited to glass, silica, latex (polyisoprene), and cellulose acetate.

Exemplary inks exhibit strong binding to themselves. For instance, an exemplary ink may be used to print a self-supporting structure containing one or more overhangs at least up to 50° from the horizontal.

Exemplary inks are usable in high-resolution printing. An exemplary print resolution for exemplary inks is at least as small as 100 μm on any of a variety of substrates. That is, the substrate-nonspecific resolution is at least as small as 100 μm. Printing tips may accordingly be 100 μm in diameter or smaller. Exemplary methods of 3D printing may extrude an exemplary ink with one or more tips each with a diameter of 100 μm or smaller. An exemplary pressure may employ a constant pressure (even for a long duration, e.g., at least 2 hours) to extrude ink at a steady rate, leading to highly detailed prints that can flex and bend as much as common silicone rubber.

Exemplary devices produced by 3D printing of exemplary inks of this disclosure include but are not limited to tactile sensors, health monitors, and heating patches. Exemplary composites may be used for applications in printable structures, flexible devices, and heating elements, for example.

Exemplary embodiments may include Joule heating devices and Joule heating applications. Joule heating may be described as the passing of electrical current through a conductive material to generate heat by way of exciting electrons colliding with the lattice of the conductive material and creating oscillations in the lattice which radiate thermal energy. Joule heating devices may be made using exemplary conductive nanocomposites/inks according to this disclosure. CNT-silicone composites according to this disclosure may be used to make flexible Joule heating materials. The silicone base provides mechanical flexibility, while the CNTs induce conductivity. Importantly, CNTs are electrically and thermally conductive; the electrical component allows for the Joule heating phenomenon, and the thermal element means any generated heat is easily transferred to its surroundings if desired. Conversely, in a heating device used with armor, a thermal insulation layer can be placed over the heating layer of a CNT-silicone composite to trap heat near the body.

FIGS. 2A-2D depict exemplary arrangements printing CNT-silicone composites/inks of this disclosure. Direct ink writing is a powerful avenue toward building precise, microstructured, 3D devices. Exemplary printing methods and inks advantageously provide flexibility, tunability of polymeric inks, and ability to manufacture otherwise impossible to print structures like those with negative shear stiffnesses. The CNT-silicone inks according to this disclosure are highly printable and exemplary for direct ink writing. Due to the highly dispersed nature of the exemplary nanocomposites, the inks are capable of being dispensed (e.g., extruded) through tips at least as small as 100 μm in diameter with consistent pressure and flow rate for an extended period of time. This allows for the creation of high-resolution patient-specific prints, for example. Exemplary inks are relatively dense prior to curing and therefore easily maintain form and shape without collapsing from low surface tension prior to curing. Yet the inks still adhere well to a variety of substrates.

Figures 2A, 2B, 2C, 2D:
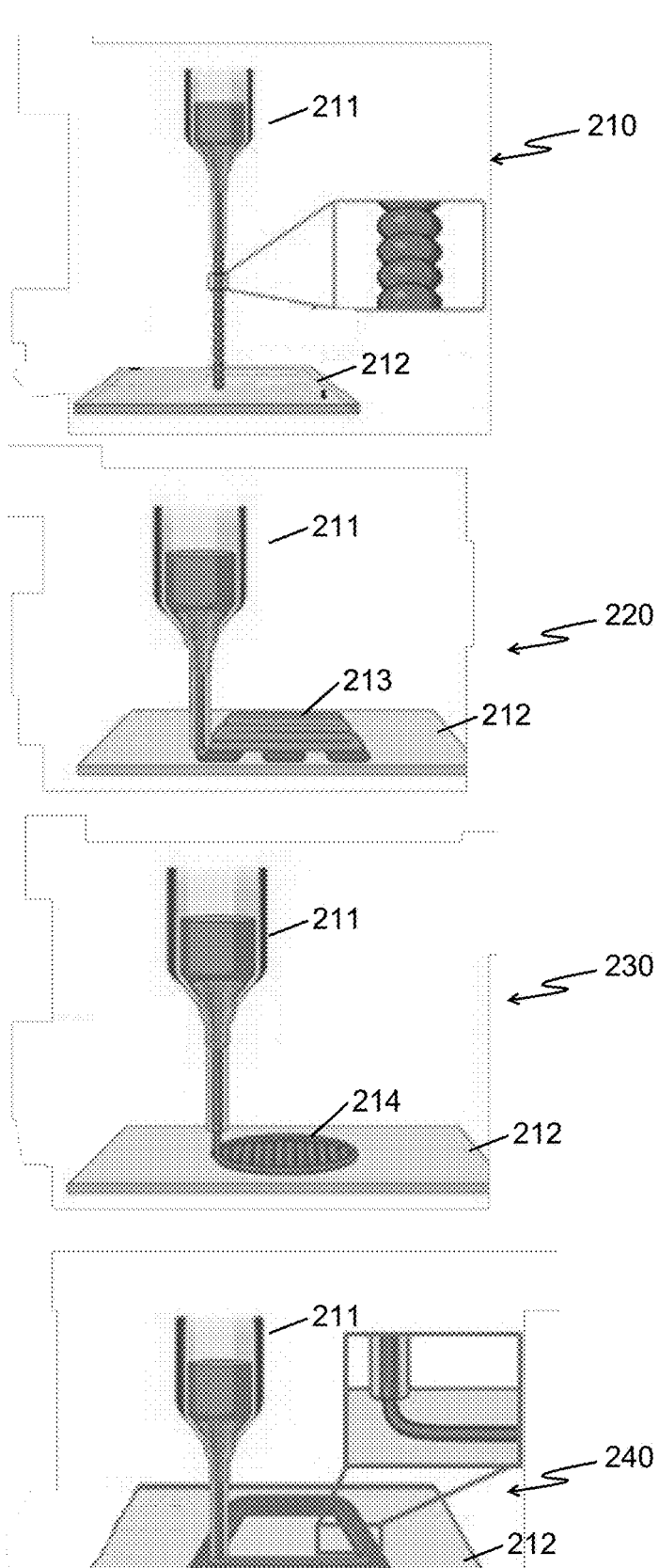
FIGS. 2A-2D depict mechanisms printing differently shaped 3D structures from exemplary CNT-silicone composites.

FIG. 2A shows a mechanism 210 printing by point dispensing. The printing nozzle 211 is configured to dispense for a certain period of time (e.g., less than or equal to a second, e.g., ~0.5 sec), stop dispensing, move a set distance, and then repeat. Over many cycles, this yields multiple, uniform spheroids which merge to form a larger 3D structure on the substrate 212.

FIG. 2B shows a mechanism 220 printing layers of free-standing CNT-silicone composite. This approach is suitable for fabricating a multi-layer mesh-like textile or sensor, for example. The textile 213 is stretchable, highly conductive, and highly responsive to mechanical stress in all three dimensions (X, Y, and Z). The printed item may be easily removed from the substrate 212 after printing is completed. Each column and row of the print may be spaced apart from neighboring columns or rows so no gaps exist. Alternatively, the printing may be programmed such that columns and/or rows are separated from one another sufficiently to turn the textile from a solid body with no gaps to a web that is transparent between separated lines of print. Advantageously, no sacrificial layer is required to achieve such an interwoven pattern, owing to the ability for the composite to bond to itself and keep its shape before, during, and after printing. Adjacent line widths may be, for example, 100-300 μm, e.g., ~200 μm, and line spacing may be for example 2-3 mm, e.g., ~2.5 mm.

FIG. 2C shows a mechanism 230 printing by line extrusion. This print method may be desired for making some patient-specific devices, for example. For example, a fingerprint may be scanned, mapped into a DXF file as a continuous line segment, converted into 3D printable G Code, and then printed as one continuous line on a substrate with, e.g., ~100 μm resolution. The resulting printed device 214 is conductive from end to end, with no discontinuity of the conduction path before and after curing. Moreover, the final print is flexible and stretchable. The substrate may be subjected to torsion, compression, and/or stretching without harming or disconnecting the print, indicating excellent flexibility. Exemplary inks of this disclosure are 3D-printable to recreate features as fine and specific as the ridges of a finger as well as other highly customizable detailed 3D printed devices.

FIG. 2D shows a mechanism 240 printing ink in a self-supporting stack configuration 215. The mechanism 240 extrudes the ink in a pattern of stacking layers of silicone offset from each other by a controlled lateral distance. By this technique angled, self-standing structures are formed without the need for a sacrificial layer.

Exemplary printing mechanisms may comprise a robot gantry capable of moving precisely in X, Y, and Z dimensions and a dispensing system (e.g., a pneumatic dispensing system) capable of printing at desired pressures, e.g., within the range 0.1-300 psi. Ink may be extruded through nozzles of different sizes, e.g., with inner diameters in the range of 100 μm and 1.60 mm, or at least as small as 100 μm. Curing may be achieved under ambient temperature and humidity, with satisfactory curing occurring within e.g., 24 hours.

Figure 3A:
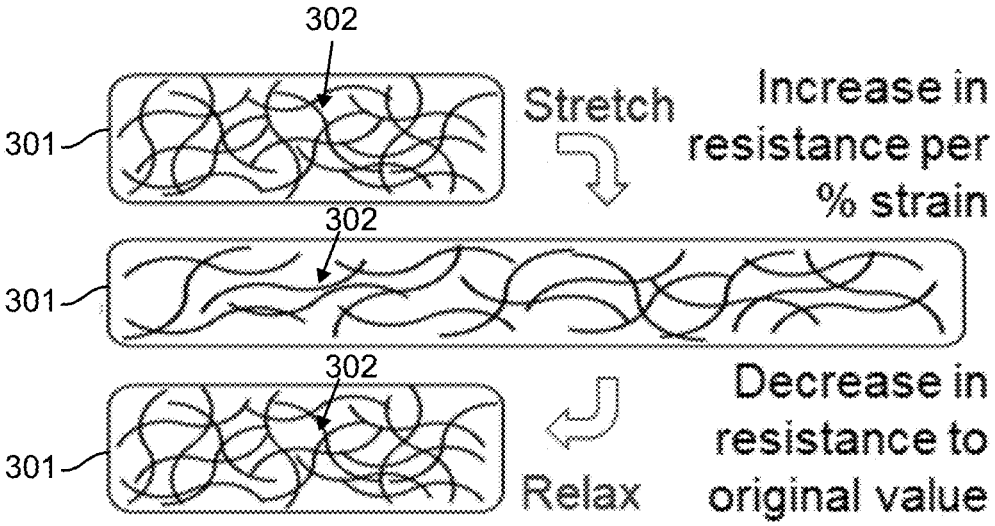
FIG. 3A is a diagram depicting cured CNT-silicone ink's response to strain.

FIG. 3A is a diagram depicting cured CNT-silicone ink's 301 response to strain. Exemplary CNT-silicone inks may exhibit a high elasticity after curing. As a conductive and flexible material, the presented CNT-silicone composite is a prime candidate for wearable skin sensors or sensors incorporated into or attached to flexible textiles. Pouillet's Law gives the resistance of a charge-carrying material in the ideal case as, R=ρl/A, where A, where R is the resistance, ρ is the specific resistance, l is the length, and A is the cross-sectional area of the material. Since exemplary inks are highly flexible, stretching the material or compressing it depending on the orientation can cause changes to the resistance by compressing the area or shortening and stretching the length. Because CNTs form a network of one-dimensional conductive pathways, ink according to this disclosure is more responsive to strain than other inks embedded with conductive nanoparticles or 2D graphene platelets.

Stretching of the CNT-silicone network 302 reduces the number of pathways available for electrical percolation, causing electrical resistivity to increase as the number of CNT-CNT interactions decreases. The composite 301 returns to its original electrical state when the tension force is removed. Exemplary embodiments may include sensors for sensing/measuring stretch or deformation of a material. The electrical conductivity of a CNT-silicone strip 301 may be monitored continuously, and an amount of deformation measured based on the electrical conductivity readings (in particular any changes in the conductivity over time).

Figure 3B:
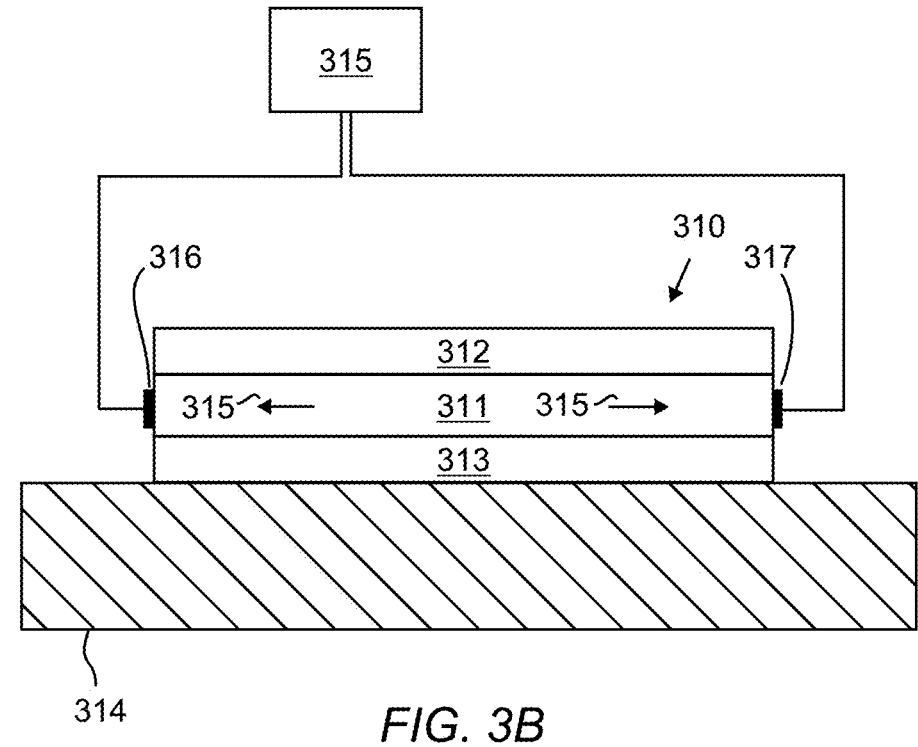
FIG. 3B is a schematic of an exemplary force sensor.

FIG. 3B is a schematic of an exemplary force sensor 310 which leverages the functionality just described with respect to FIG. 3A. The device 310 at a minimum comprises a layer 311 of cured CNT-silicone composite according to this disclosure. Depending on the use case, the sensor 310 may comprise further layers. For instance, non-conductive silicone-based layers 312 and 313 may be provided to either side of the conductive layer 311 to provide physical reinforcement. The layers 312 and 313 sandwich the layer 311 between themselves. This multi-layer configuration increases the maximum forces to which the conductive layer 311 may be subjected without damaging the sensor 310. The sensor 310 may be configured to be sensitive to one or more forces to which it is subjected. For instance, the sensor 310 may provide a signal which changes based on the tensile forces 315 to which the sensor is subjected. The forces may be transferred from the surface 314 of the object to be monitored. The surface 314 may be a textile (e.g., of apparel), skin of a patient, or even an internal anatomical surface like the surface of an organ or of a tumor. Electrical contacts (e.g., electrodes) 316 and 317 are present to connect the sensor 310 with a sensor signal processing device 315 such as a processor (or processors). The raw signals from the sensor 310 may be, for example, current, voltage, or resistance measurements the quantitative fluctuations of which are monitored and recorded by the signal processing device 315.

EXAMPLES

Ink Preparation: Ink used in the following examples was prepared as follows, consistent with the general process depicted by FIG. 1. Amino-functionalized multi-walled carbon nanotubes of diameter~20 nm and length~1-12 μm were mixed with butyl acetate in a 1:100 w/w ratio and sonicated for 15 minutes (40 kHz), forming a CNT-butyl acetate slurry. During CNT sonication, a separate mixture was prepared. Butyl acetate, an alkoxy-cure RTV silicone, and methyl-terminated polydimethylsiloxane (100 cSt) were combined in a 50:100:15 weight ratio and mixed in a planetary centrifugal mixer at 2000 rpm for 300 seconds. The resulting homogenous dispersion was then added to the CNT-BA slurry, and the mixture was placed into the planetary mixer for 300 seconds at 2000 rpm. The resulting viscous liquid, composed of CNT, butyl acetate, MEP, and RTV silicone in a homogenous dispersion, was spread onto several Petri dishes and placed in a vacuum chamber until all butyl acetate evaporated. The final ink was scraped from the Petri dishes and transferred to a syringe. Dow 738, a neutral curing silicone, was selected as the silicone base for the ink, rather than specific commonly used elastomers such as Sylgard 184 or Loctite SI 595. Sylgard 184 was not used because of its two-part nature, which may hinder ease of use and storage. Meanwhile, acetoxy silicones such as Loctite SI 595 were found to be incompatible with the employed printing process; their tack-free times were too short, leading to premature hardening and clogging within the syringe. Dow 738, a silicone that cures slowly to a tack-free time of 90 min, was chosen because it maintains its thixotropic properties well within the printing syringe, allowing for the completion of detailed prints.

3D Printing: Unless described otherwise, the following examples printed inks as follows. The CNT-silicone inks were printed using a custom robot gantry capable of moving precisely in X, Y, and Z dimensions and printing in pressures from 0.1-300 psi using a pneumatic dispensing system. A computer allowed for instructions for simple lines and shapes to be added manually, while the ability to upload CAD files as OBJ objects or DXF drawings allowed for printing of predetermined, high-resolution structures. The ink was extruded through various plastic tapered tips with inner diameters ranging from 200 μm to 1.60 mm, and metal tips which inner diameters of 100 μm and 150 μm. Following the completion of the printing process, the prints were cured under ambient temperature and humidity for 24 hours.

Data Collection: A scanning electron microscope at 10 kV was used to obtain micrographs. Samples were gold sputter coated. Raman spectra were carried out by a Raman Spectrometer with a 532 nm source under ambient conditions. XPS spectra were obtained with a scanning XPS Microprobe. Contact angle measurements were taken with a goniometer. Thermal imaging measurements were taken in 640×512 resolution with an IR thermal camera.

Example 1. Solvent Comparisons

Butyl acetate (BA) is valued for its low toxicity, moderate polarity, and green production method. BA is an ester found in various fruits and is often used in synthetic fruit flavorings for its aroma. BA is moderately volatile (bp=126° C.); thus, complete evaporation can occur within a reasonable time frame under vacuum at room temperature. Notably, BA is not known for its ability to disperse CNTs, especially when compared to more commonly used solvents such as Dimethylformamide (DMF) and N-Methyl-2-pyrrolidone (NMP).

A CNT concentration of 10 mg/mL (required amount for high conductivity) in any organic solvent yields a slurry rather than a solution. Nevertheless, it was found that a solvent's miscibility with silicone is a much more critical factor in the homogeneity of the final CNT-silicone nanocomposite than the solvent's ability to disperse CNT. As such, solvents such as DMF, NMP, and m-cresol, which are superior in forming CNT dispersions, do not create as well-dispersed CNT-silicone composites. Instead, BA, which possesses Hansen solubility parameters of 15.3, 4.3, and 7.6 which are closer to uncured PDMS than other solvents discussed, is able to quickly dissolve uncured one-part RTV silicone.

Example 2. Considerations for Direct Ink Writing Applications

Inks intended for direct ink writing applications may have one or more additional components tailored to this intended application. While the above-described method employing a BA solvent synthesizes well-dispersed homogeneous silicone and CNTs, one or more additives may be desired in some embodiments to make the material appropriate for applications such as direct ink writing 3D printing.

MEP (methyl-terminated polydimethylsiloxane) was used to thin the PDMS mixture to decrease the viscosity of the ink and make it adhere well to itself and substrates and extrude better from small tips. The inclusion of MEP reduces the viscosity of the ink.

A 15:100% w/w ratio of MEP:silicone was found to be the maximum ratio at which the silicone nanocomposite would still cure. Using a greater amount of thinner (MEP) invariably led to a slightly sticky product, indicating no complete curing. A ratio of 15:100:50 was selected for the final MEP:silicone:BA mixture. Values lower than 50% w/w of BA tended to make the mixture too viscous and not mix well.

One-part inks exhibited desirable properties over two-part inks. A two-part ink was found to have a working time equal to or less than 30 minutes. By contrast, an exemplary one-part CNT-silicone ink was usable for continuous printing for over two hours without needing to increase printing pressure. In addition, a one-part ink stores for considerably longer time than a two-part ink. A well-sealed one-part ink was still usable after 72 hours of storage following initial preparation at room temperature.

The tested one-part CNT-silicone ink easily printed high-resolution and self-supporting structures on glass, Scotch tape, and latex. Glass, $SiO_2$, represents an extremely polar substrate, while latex (polyisoprene) is a representative nonpolar substrate. In addition, the ink binds well to itself, allowing for self-supporting structures printed with overhangs of up to at least 50° from the horizontal.

Printing at ~100 μm resolution was achieved on all of the tested substrates. Due to the excellent homogeneity of the ink, there are no CNT aggregates to cause clogging or inconsistent dispensing while printing through 100 μm inner diameter tips. The result is that a constant pressure can be used to extrude ink at a steady rate, leading to highly detailed prints that can flex and bend as common silicone rubber. Moreover, as later confirmed by Raman spectra, the fundamental bonding interactions of CNTs are not changed during mechanical stress and restoration (see, e.g., FIG. 3A).

Example 3. Characterization of CNT-Silicone Ink

FIGS. 4-13 and 14A-14D show mechanical, electrical, and structural characterization of sample one-part CNT-silicone nanocomposites. Tensile and compressive moduli were measured with a texture analyzer. The load was reset before all tests, and force and height were calibrated. The mechanical tests were performed under constant speed and varying strains creating longer testing times for higher strain measurements. Tensile grips were used for all tension measurements. A cylindrical 1 cm² stainless steel probe was used for compression measurements.

Figure 4:
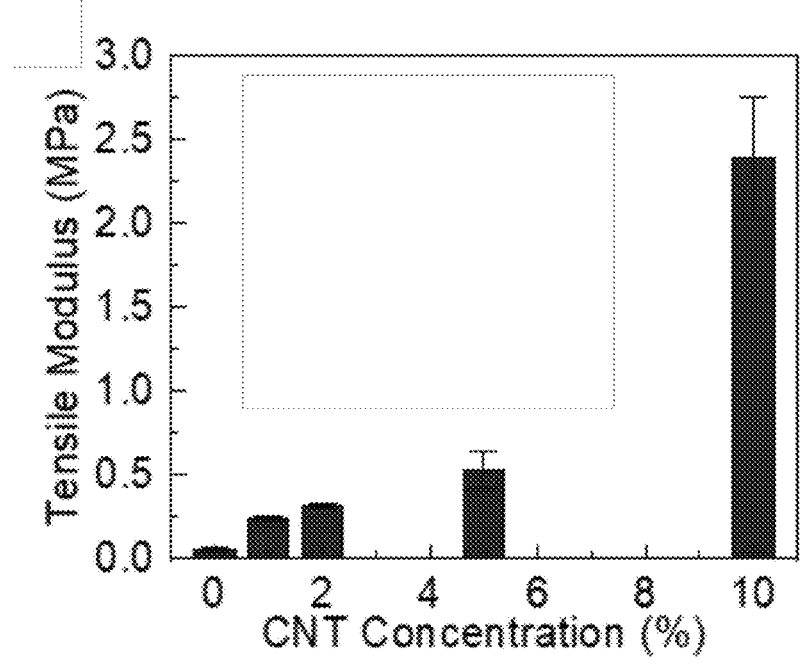
FIG. 4 is a graph of tensile moduli of one-part CNT-silicone nanocomposites. The data reflects the materials' stretchability and potential for use on curved and dynamic surfaces.
Figure 5:
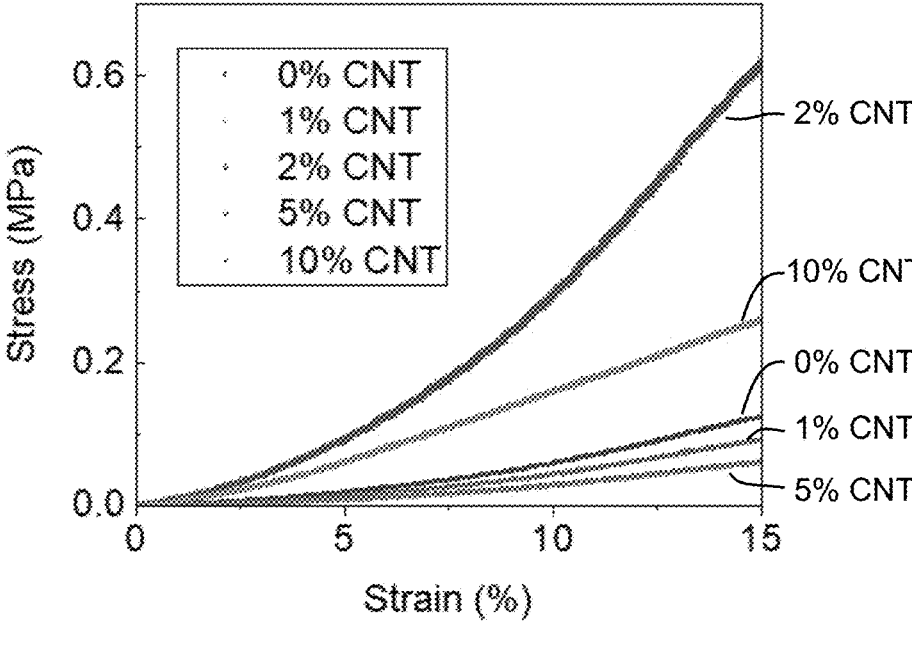
FIG. 5 is tensile data of conductive CNT-silicone composites.

Tensile moduli obtained for the formulated CNT-silicone inks were remarkably low, demonstrating the ductility of the nanocomposites (see FIGS. 4 and 5). A definite increase from 0% CNT samples is witnessed with 1% and 2% CNT formulations, demonstrating the formation of crosslinked CNT networks. Even at 5% loading of CNT, the resulting composite is very stretchable with a tensile modulus of ~0.5 MPa. Larger tensile moduli are observed with increasing CNT concentrations, with a notable increase at 10% CNT.

Figure 6:
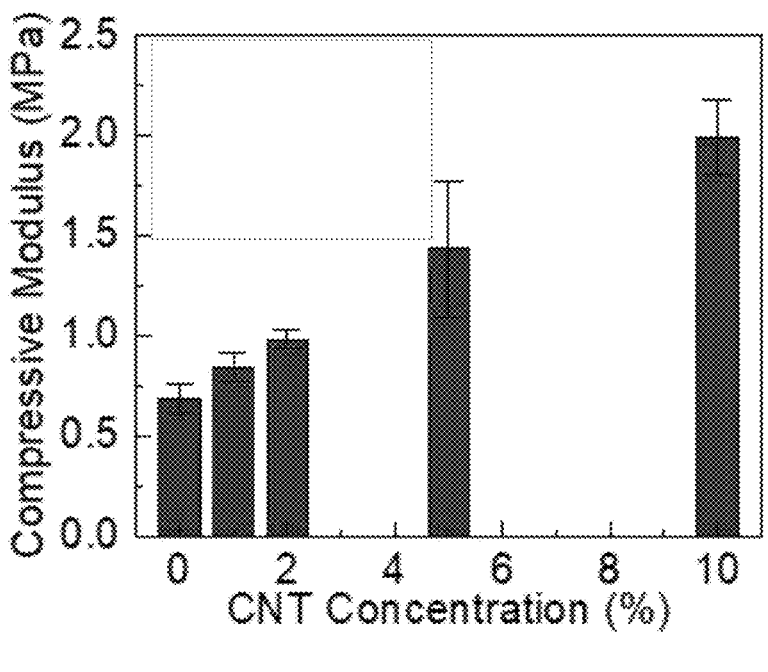
FIG. 6 is a graph of compressive moduli of one-part CNT-silicone nanocomposites. The data demonstrates excellent compressibility that decreases with increasing CNT loading.
Figure 7:
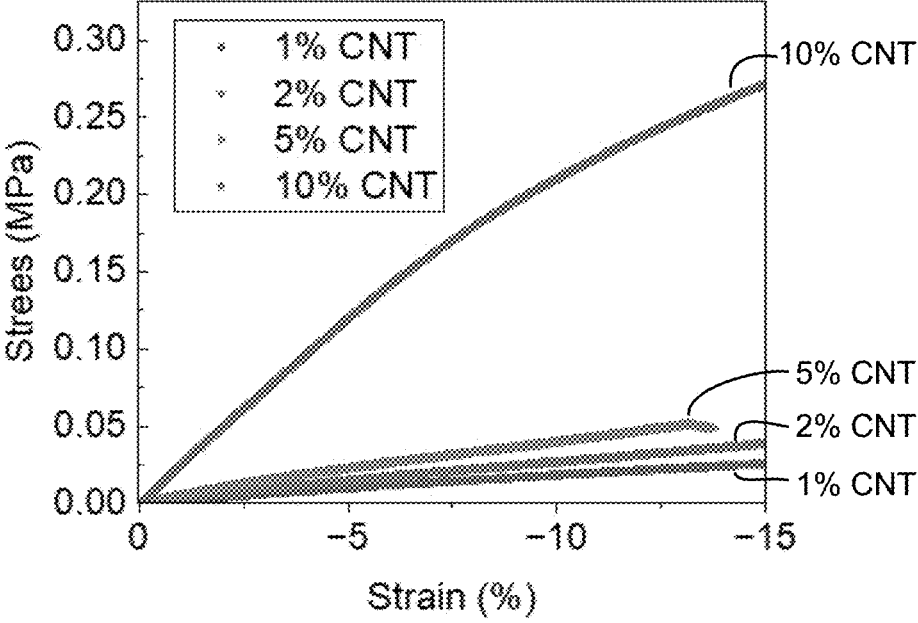
FIG. 7 is compressive data of conductive CNT-silicone composites.

Similarly, the compressive moduli of the composites show an increase with CNT % loading, resulting in increasing in modality (0.69, 0.85, 1.00, and 1.99 MPa for 0, 1, 2, 5, and 10% CNT loadings, respectively) (see FIGS. 6 and 7). Higher than 10% CNT addition to silicone results in decreased mechanical properties.

These mechanical properties indicate that the composite synthesis demonstrates high ductility and flexibility comparable with ordinary silicone or PDMS. This can be attributed to the homogenous dispersion of CNTs within the polymer matrix. Agglomeration of CNTs would otherwise lead to decreased tensile strength and increased brittleness. Furthermore, a low tensile modulus is critical for skin-attachable tactile sensors, which must flex and stretch with the movement of limbs and organs without tearing or inhibiting movement. Well-dispersed CNT structures allow for smooth movement of silicone chains past each other, which may also permit extensive percolation networks and high electrical conductivity.

Figure 8:
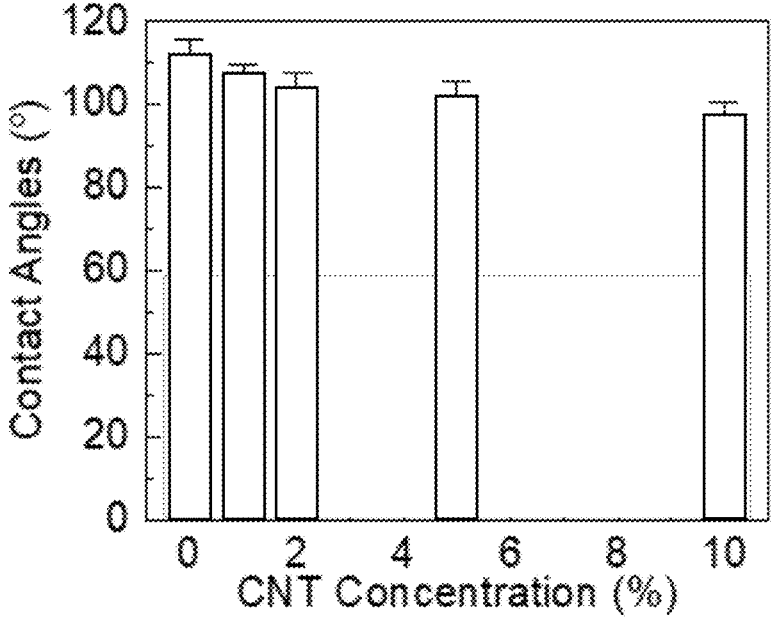
FIG. 8 is contact angle measurements showing a remarkable decrease in hydrophobicity with increased CNT concentration, with the amino modification on MWCNT being a primary factor.

Contact angle measurements demonstrate decreasing hydrophobicity (i.e., increasing hydrophilicity) as CNT concentrations increase (FIG. 8). This trend is somewhat contrary to what has been reported in the literature; in the past, MWCNT composites have been used to increase the natural hydrophobicity of silicone. However, this may be attributed to using amino-functionalized multi-walled CNT (MWCNT-$NH_2$). Adding polar amino groups to the aromatic CNT foundation increases the hydrophilicity of the MWCNT. These amino groups may be responsible for increasing surface wettability and may explain the versatility of the nanocomposite ink in bonding to various substrates. The change in hydrophilicity is slight (less than 10%), and overall, the material is slightly hydrophobic, which has potential applications in specific lab-on-a-chip experiments, which often require hydrophobic materials patterned at a high resolution to mimic physiological tissue.

Figure 9:
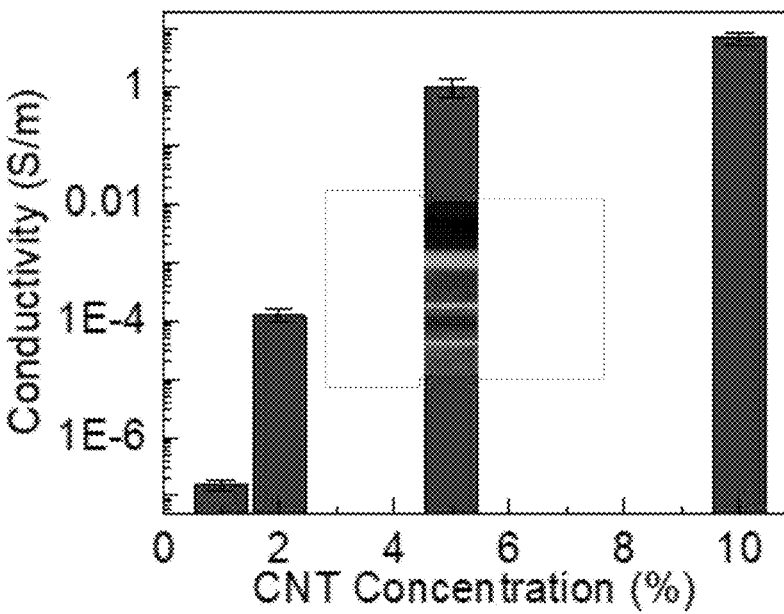
FIG. 9 is CNT-silicone nanocomposite conductivity relative to CNT concentration.
Figures 10A, 10B, 10C, 10D:
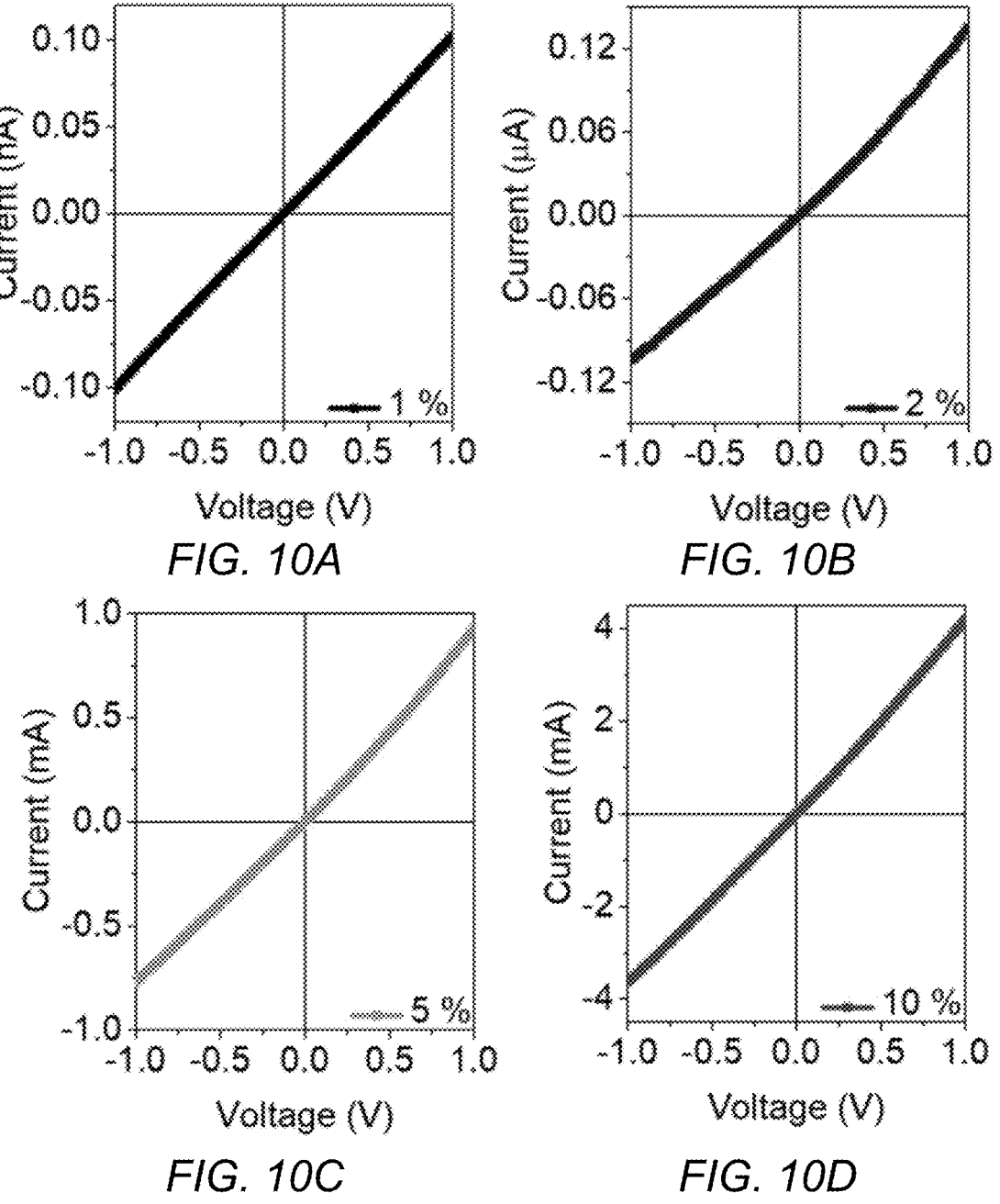
FIGS. 10A-10D are current-voltage (I-V) graphs of one-part CNT-silicone nanocomposites at different CNT concentrations obtained from a voltage sweep of −1.0V to 1.0V. The graphs' linear morphology demonstrates the conductive composites' Ohmic properties.

FIG. 9 is CNT-silicone nanocomposite conductivity relative to CNT concentration. FIG. 9 shows CNT-silicone nanocomposites can conduct current at loadings as low as 1%, and the conductivity of CNT-silicone nanocomposites increases exponentially with concentration for at least a particular range of concentrations. Electrical conductivity increased with increasing CNT concentration, ranging from ~$1 \times 10^{-4}$ S/m for 2% CNT-silicone to ~7 S/m for 10% CNT-silicone composites. However, increases in conductivity are reduced as the CNT's faction is over 5%, indicating that the conductivity would behave asymptotically as the conductivity becomes saturated with CNT fractions. FIGS. 10A-10D are current-voltage (I-V) graphs of the one-part CNT-silicone nanocomposites at different CNT concentrations obtained from a voltage sweep of −1.0V to 1.0V. FIG. 10A shows the results for nanocomposite with 1% CNT. FIG. 10B shows the results for nanocomposite with 2% CNT. FIG. 10C shows the results for nanocomposite with 5% CNT. FIG. 10D shows the results for nanocomposite with 10% CNT. The graphs' linear morphology demonstrates the conductive composites' Ohmic properties.

Figures 11, 12:
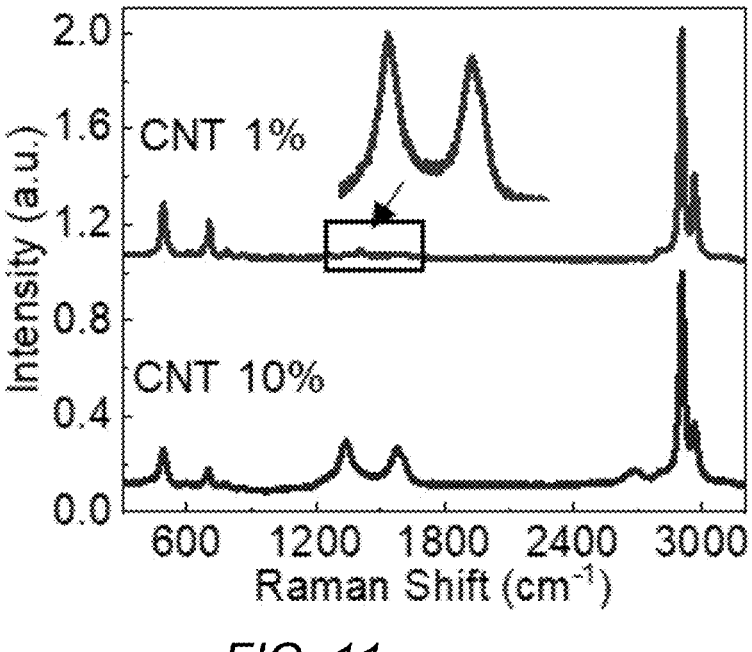
FIG. 11 is a comparison of the Raman spectra for 1% and 10% loadings of CNT. The data demonstrate pronounced D and G bands for the 10% loading sample.
FIG. 12 are Raman spectra for unstretched and stretched samples. The similarity in results indicates stability in chemical structure.

FIG. 11 presents the Raman spectra of the CNT-silicone composites to characterize the internal bonding structures of the CNT components before and during stretching. The D-peaks at 1350 $cm^{-1}$ demonstrate the sp3 hybridized carbons or amorphous carbon structures. The G-peaks at 1575 $cm^{-1}$ represent the sp2 hybridized carbons that make up the backbone of the carbon nanotubes. As evidenced by the amplitudes of the peaks for 1% CNT-silicone versus 10% CNT-silicone, the intensity of the D- and G-peaks increased with increasing concentration. The peaks near 2900 $cm^{-1}$ indicate the structure of silicone is not changed in the fabrication process from 1% to 10% CNT loading.

FIG. 12 offers a comparison of stretched versus unstretched CNT-silicone samples, revealing little change in the Raman spectra. This result shows that intrinsic chemical properties of the composite are not altered during mechanical stress. This is useful for a sensing material, which is designed to undergo constant and repeated stress and needs to maintain its chemical and physical structure.

Figure 13:
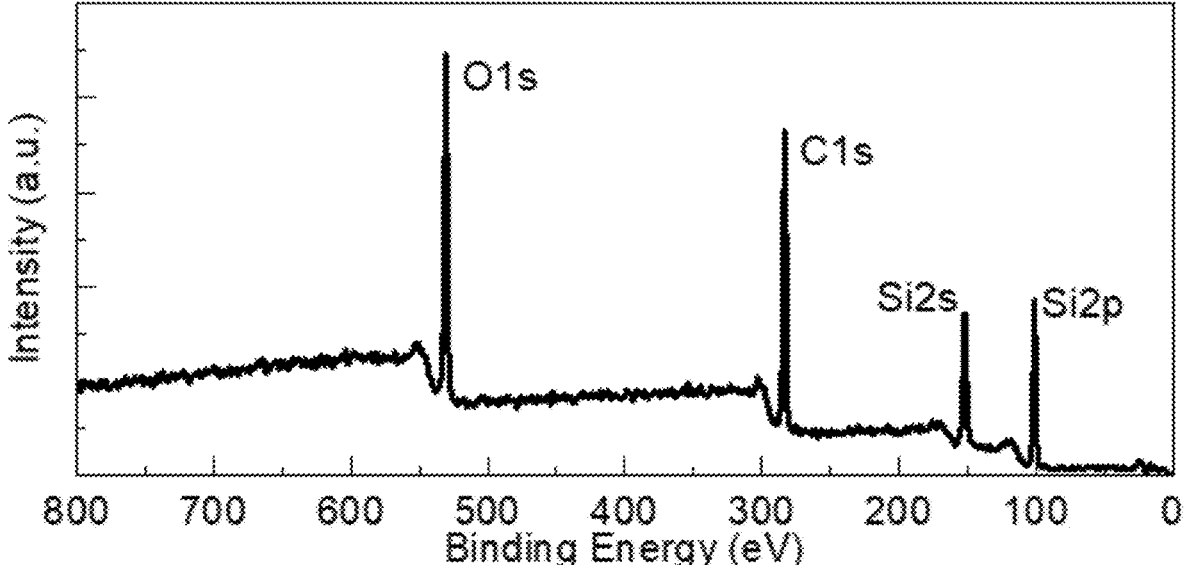
FIG. 13 is a survey X-ray photoelectron spectroscopy (XPS) spectra displaying peaks originating from both CNT and silicone.

FIG. 13 is x-ray photoelectron spectroscopy (XPS) spectra of the CNT-silicone composite showing O1s, C1s, Si2s, and Si2p peaks, all associated with carbon nanotube-silicone nanocomposites.

Figure 14A:
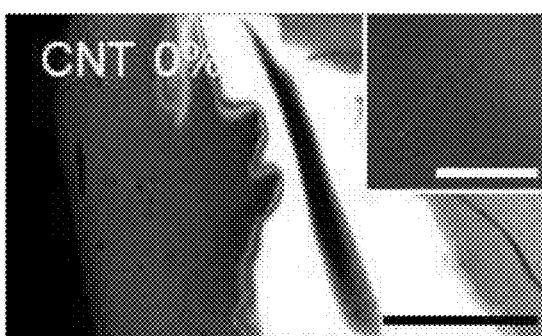
FIGS. 14A-14D are scanning electron microscope (SEM) images of four materials with different CNT concentrations. Higher surface roughness is correlated with increasing CNT concentration.
Figure 14B:
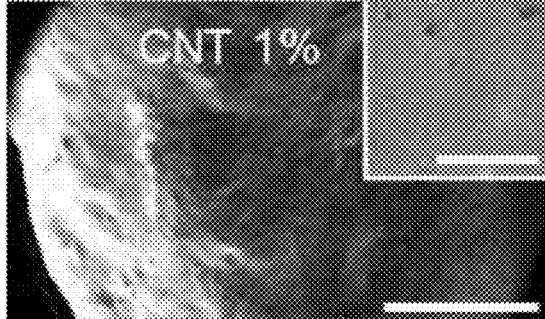
Figure 14C:
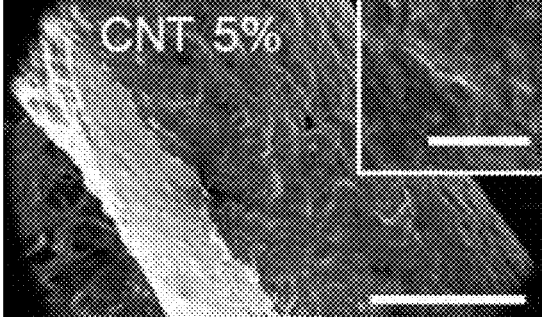
Figure 14D:
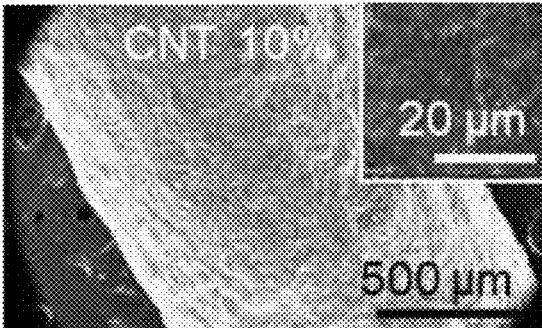

FIGS. 14A-14D are scanning electron microscope (SEM) images of four materials with different CNT concentrations. FIG. 14A shows the CNT 0% material. FIG. 14B shows the CNT 1% material. FIG. 14C shows the CNT 5% material. FIG. 14D shows the CNT 10% material. SEM images demonstrate excellent dispersion of CNT, even at high loading %. The SEM images further demonstrate the surface roughness of extruded CNT-silicone samples changes with various concentrations. At increased concentrations, the number of exposed CNTS on the surface of the composite increases, influencing surface properties. Excellent dispersion is visible, from low concentrations (1%) to high concentrations (10%), where aggregation becomes a more significant issue.

The measurements in this Example were obtained for materials with varying concentrations of CNT. Summary mechanical and electrical data of CNT-silicone composites is provided in Table 1. The physical characteristics for MEP/silicone without any CNT included served as a control.

TABLE 1

| | Mechanical and electrical data of different composites. | | | |
|---|---|---|---|---|
| sample | tensile modulus (MPa) | compressive modulus (MPa) | electrical conductivity (S/m) | contact angle (degrees) |
| MEP/silicone (0 wt % CNT/ silicone) | 0.055 ± 0.007 | 0.689 ± 0.074 | ND | 111.20 ± 3.29 |
| 1 wt % CNT/ silicone | 0.245 ± 0.014 | 0.845 ± 0.071 | $1.56 \times 10^{-7}$ ± $3.48 \times 10^{-8}$ | 107.50 ± 2.01 |
| 2 wt % CNT/ silicone | 0.320 ± 0.016 | 0.979 ± 0.048 | $1.25 \times 10^{-4}$ ± $2.92 \times 10^{-5}$ | 104.40 ± 3.01 |
| 5 wt % CNT/ silicone | 0.532 ± 0.114 | 1.434 ± 0.343 | 1.037 ± 0.341 | 102.32 ± 3.55 |
| 10 wt % CNT/ silicone | 2.396 ± 0.365 | 1.995 ± 0.186 | 7.246 ± 1.787 | 97.78 ± 2.90 |

In the case of tensile and compressive moduli, increased CNT concentration leads to degradation of mechanical properties, specifically compressibility, and stretchability. CNT concentrations above 10% were found to display increased printing viscosity and increased brittleness of the final composite. However, increased CNT concentration enables higher electrical conductivities and better resistive response to stimuli, which is highly valued in biomedical sensors. Therefore, an intermediate concentration of 5% was found to be optimal for 3D printing CNT-silicone inks, as it combines high flexibility and stretchability with strong electrical conductivity of ~1 S/m. This ink allows conductive 3D networks at high resolution, with excellent flexibility, hydrophobicity, and good electrical conductivity, to be reliably printed in multiple orientations and devices.

Example 4. Joule Heating and Temperature-Sensing Properties

Various thermal imaging measurements were taken of a 5% CNT-silicone nanocomposite to assess its suitability as a flexible Joule heating element or as a temperature sensor.

Figure 15:
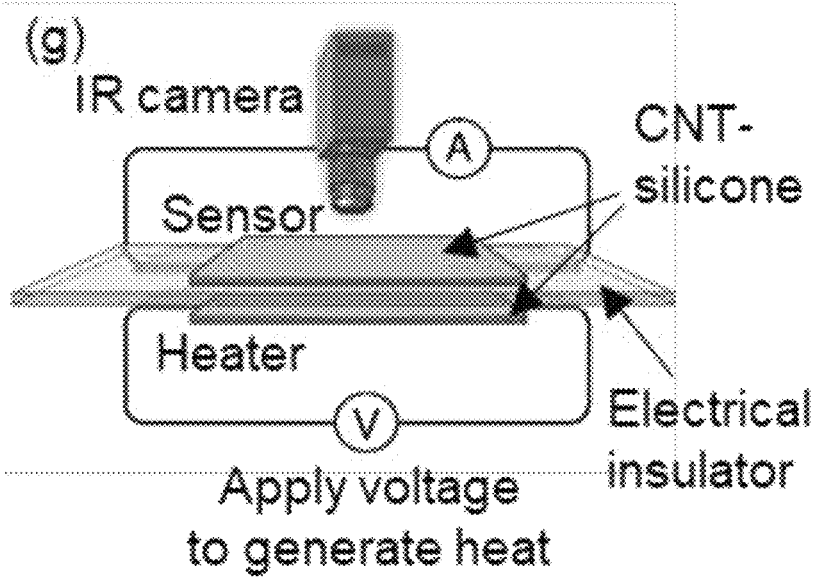
FIG. 15 is a setup for assessing the Joule heating and temperature-sensing properties of a CNT-silicone nanocomposite.

FIG. 15 shows a setup used to obtain the data in subsequent figures. The lower CNT-silicone sample acts as a Joule heater. The Joule heater has voltage applied by a voltage source. For some tests, the electrical insulator, top sensor, and voltmeter are omitted. The IR camera measures the temperature of the heater element. For some tests, all items depicted in FIG. 15 are present. The heat from the heater passes to the electrically insulated upper CNT-silicone sample. In this case the IR camera measures the temperature of the upper CNT-silicone sample, while a voltmeter measures its resistance.

Figure 16:
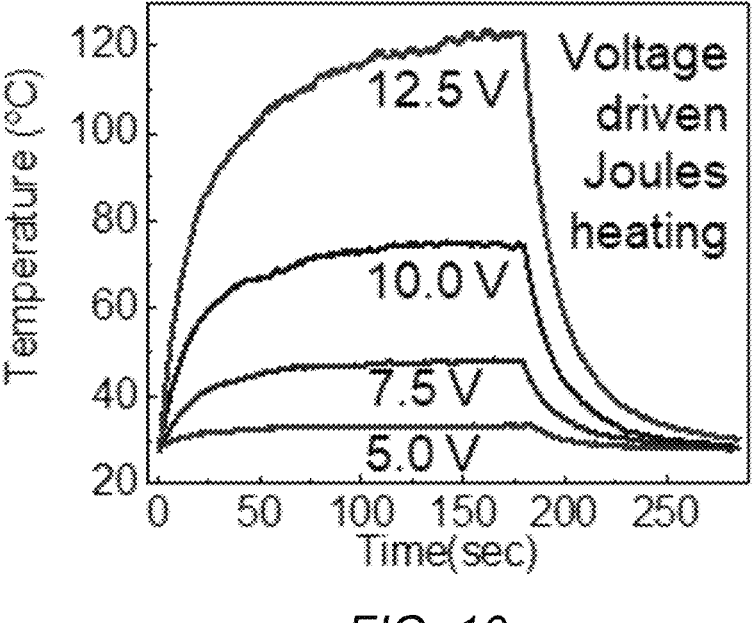
FIG. 16 depicts thermal imaging measurements of a 5% CNT-silicone nanocomposite. Voltage-driven Joule heating was observed for the nanocomposite, generating temperatures >5° C. above room temperature even at 5.0V.
Figure 17:
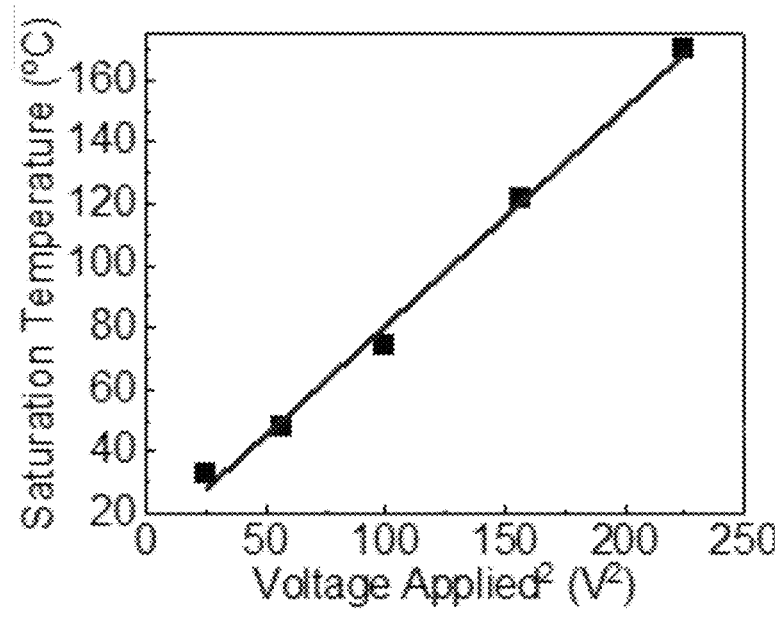
FIG. 17 is a plot of voltage applied vs. saturation temperature. The linear plot closely aligns with the physical model of Joule heating.

FIG. 16 shows temperature over time for a 5% CNT-silicone nanocomposite subjected to various voltages to drive Joule heating. FIG. 16 demonstrates the rapid heating and cooling of the CNT-silicone nanocomposite. Thermal images showed uniform heating that enveloped the entire composite without forming warm or cool spots. At low voltage loadings of 5.0 V, a noticeable increase in temperature is obtained. As voltage is increased, the saturation temperature is directly correlated with the square of the applied voltage. This aligns with the physical concept of Joule heating; the power dissipated by a voltage (V) and resistance (R) is $P=V^2/R$. Thus, the rate of Joule heating, and consequently saturation temperature, is directly proportional to the square of the voltage applied, as conveyed by FIG. 17. At 12.5 V, the boiling point of water, ~100° C., is surpassed.

Figure 18:
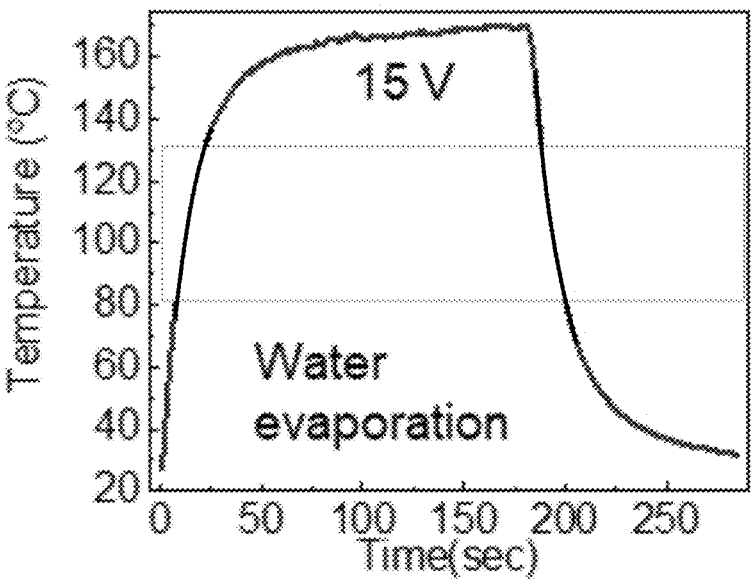
FIG. 18 is temperature of a water droplet over time heated by a small, superheated CNT-silicone pad subjected to a 15.0 V voltage. Temperatures above 160° C. are reached with the application of 15.0 V. After several seconds of contact with the Joule heating element, the water droplet was boiled away completely.

FIG. 18 is temperature of a water droplet over time heated by a small, superheated CNT-silicone pad subjected to a 15.0 V voltage. At 15.0 V, the small, superheated CNT-silicone pad reached >~160° C. and boiled away a water droplet within seconds. The success of this proof of concept points to the potential for off-terrain water distillation and purification, where a soft, flexible, easy-to-store device is desired.

Figure 19:
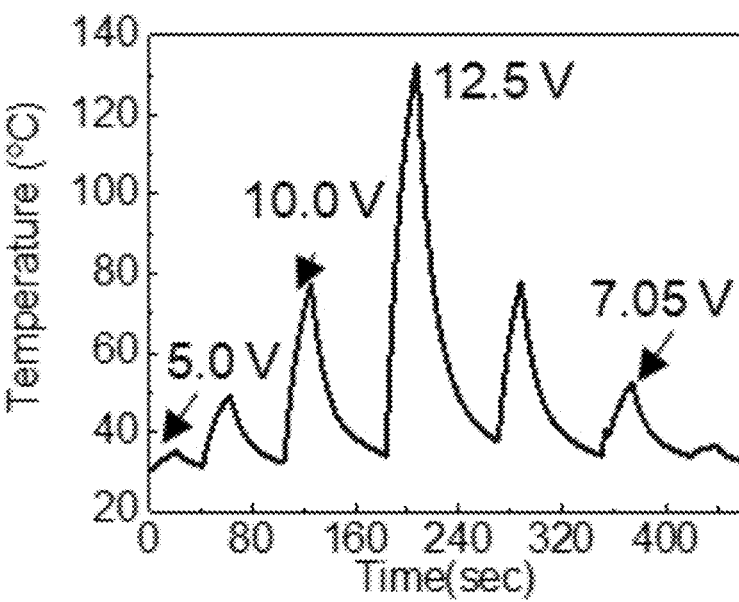
FIG. 19 is temperature vs. time plot reflecting the response time of the CNT-silicone composite to voltage. The nanocomposite displays versatility with various voltage levels, with no sign of fatigue after switching between 5.0, 7.5, 10.0, and 12.5V.
Figure 20:
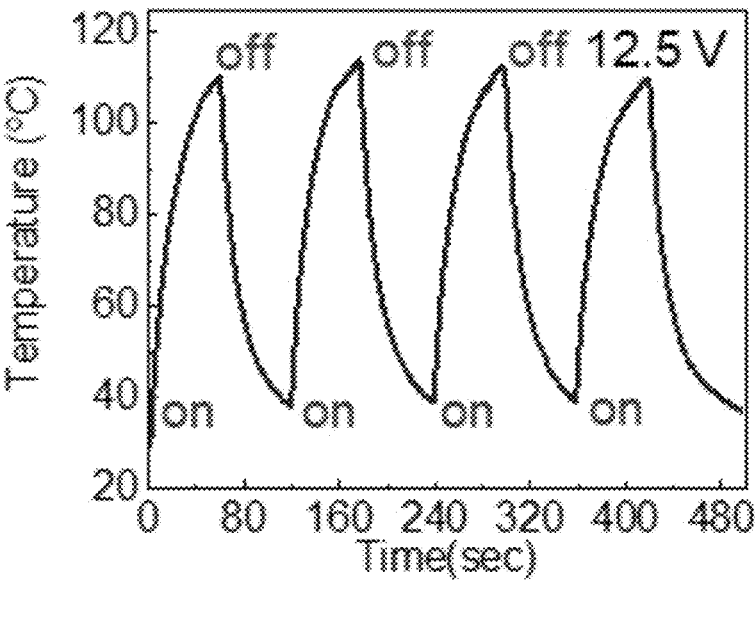
FIG. 20 is temperature vs. time plot for multiple consecutive on-off cycles of 12.5 V p applied to the composite. Cycling of the CNT-silicone nanocomposite demonstrates minimal hysteresis. After the current is removed, the CNT networks return to their original temperature and conformation.

FIG. 19 is a temperature vs. time plot reflecting the response time of the CNT-silicone composite to voltage. The response time of the CNT-silicone composite to voltage is quick and reversible. Multiple cycles of increasing and decreasing voltages are shown. 90% of maximum temperature change is reached within 60 seconds of current initiation, and the silicone returns to within several degrees of room temperature within 60 seconds of current removal. Moreover, negligible hysteresis is observed after multiple cycles (FIG. 20), demonstrating that the current induction permanently changes neither the electronic nor thermal properties of CNT networks.

To examine the use of CNT-silicone composite as a dual temperature sensor and Joule heating element, the full setup depicted in FIG. 15 was employed. A CNT-silicone heater was voltage-driven for Joules heating. A silicone electrical insulating layer was situated in the middle between the heater and a CNT-silicone electrical sensor that can measure resistance and temperature changes.

Figure 21:
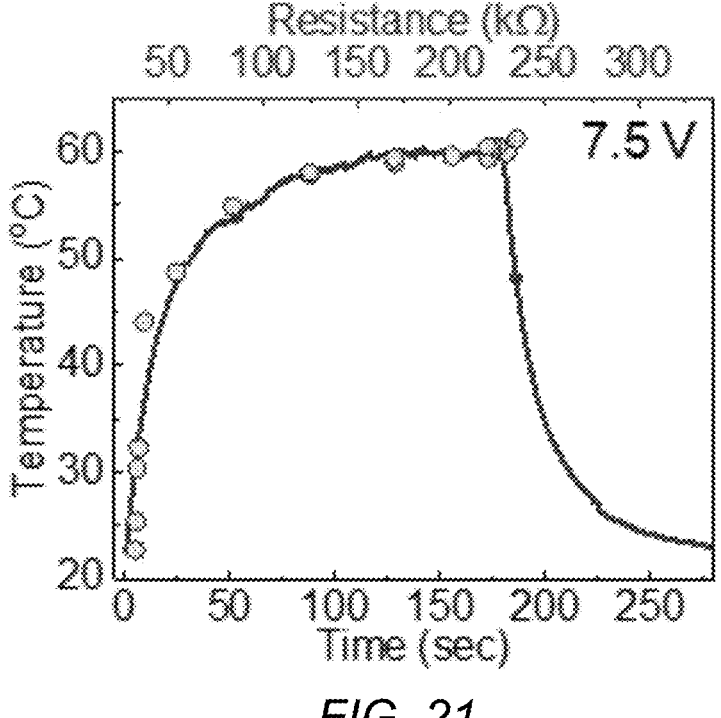
FIG. 21 shows a single on-off cycle of an applied 7.5 V, with resistance (kΩ) superimposed.

FIG. 21 shows the temperature changes recorded with a FIG. 15 setup and the corresponding resistances under the application of continuous 7.5V from the bottom heater. The data follows an exponential relationship, demonstrating the successful operation of the multifunctional Joules heating device. The CNT-silicone composites display similar thermoelectric properties to a conductor; increasing temperatures are correlated with exponentially increasing resistances.

Example 5. Printability of CNT-Silicone Ink and Self-Supporting Structures

Figure 22:
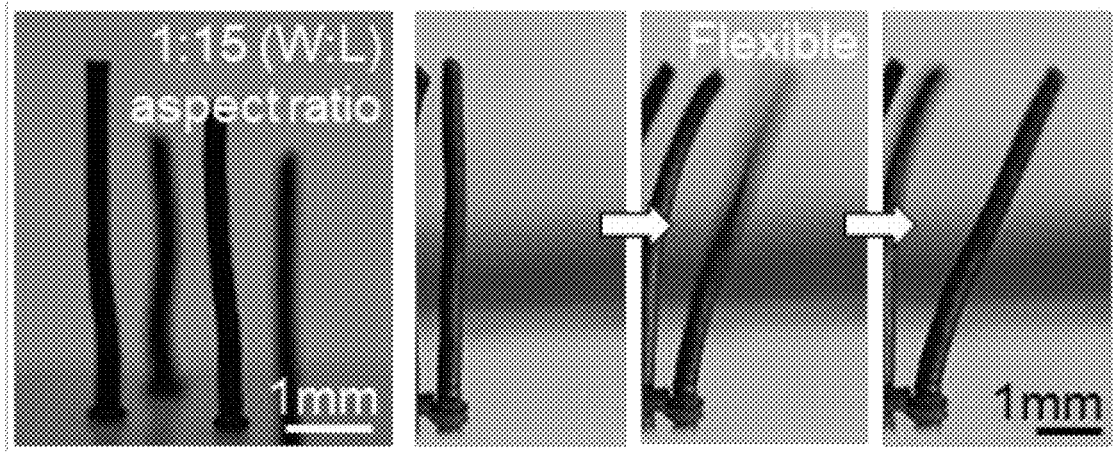
FIG. 22 are images of printed towers usable as sensors or artificial cilia.

To evaluate 3D printing of tall, micropatterned structures, the aspect ratio of CNT-silicone "towers" was evaluated. The towers were constructed through a point dispensing mechanism like that depicted by FIG. 2A. The printing consisted of cycles in which the 3D printer would dispense for a certain period of time (~0.5 seconds), stop dispensing, move up a set distance, and then continue dispensing. Over many cycles, this yielded multiple, uniform spheroids, which merged to form towers of a high-aspect ratio. The structures had heights of ~1 cm and widths of ~0.66 mm. An image of the sample towers is provided by FIG. 22. Aspect ratios of 15:1 were obtained, comparable to pure silicone. Moreover, the resulting towers were quite flexible. When airflow, from either a human breath or a pressure dispenser (~3-5 psi), was exerted on the side of the towers, they would deflect laterally without falling over. After the airflow was removed, the towers would return to their original positions. This supports applications in artificial cilia, pressure sensors, and other biosensing mechanisms where a reproducible response to air or liquid current is needed.

Next, a multi-layer mesh-like sensor was fabricated on a rubberized tape substrate (Flex-Tape), which was easily removed after the print was fully cured. The print setup was consistent with FIG. 2B. A stretchable CNT-silicone textile was printed by extruding layers of lines separated at a fixed distance apart from one another. The pattern consisted of two sets of four different layers, each with a thickness of ~0.12 mm for a total of eight layers at a thickness of ~0.96 mm. Layer one was printed with the lines along the length, layer two was printed with the lines along the width, layer three was printed again along the length but offset at the midpoint between the lines of layer one, and layer four was printed along the width with the lines offset at the midpoint between the lines of layer two. This pattern created a mesh or a textile that was optically opaque but, upon stretching, separated to reveal an interlocking grid-like structure. Consisting of a free-standing CNT-silicone composite, the textile was stretchable, highly conductive, and highly responsive to mechanical stress in all three dimensions (discussed in Example 6). This textile was printed with an adjacent line width of ~200 μm and line spacing of ~2.5 mm. Each column and row of the print were further separated to turn the textile from a solid body with no gaps to a web that is transparent between separated lines of print. The scale of this textile device is notable as it can be printed firstly with no upper limit on its size and secondly with a specific physiological destination in mind towards its length, thickness, line spacing, etc. No sacrificial layer was required to achieve such an interwoven pattern, demonstrating the ability for the composite to bond to itself and keep its shape before, during, and after printing.

Consistent with FIG. 2C, a sample fingerprint was scanned, mapped into a DXF file as a continuous line segment, converted into 3D printable G Code, and then printed as one continuous line on both a silicone and Scotch tape substrate with ~100 μm resolution. The resulting printed device was conductive from end to end, demonstrating no discontinuity of the conduction path before and after curing. Moreover, the final print was flexible and stretchable, whether on silicone or tape. The substrates' torsion, compression, and stretching did not harm or disconnect the print, indicating excellent flexibility. This Example demonstrates the use of this ink in printing patient-specific biomedical devices.

In addition, the self-supporting stacking of the ink was examined. In biomedical 3D printing, one concern is often the use of sacrificial layers, which must be washed away with water before use. This limits accessibility may induce contamination and requires an extra printing step. Exemplary CNT-silicone inks according to this disclosure present a solution to these issues by being self-supporting. By stacking layers of silicone offset from each other by a controlled lateral distance, as illustrated by FIG. 2D for example, one can form angled, self-standing structures without the need for a sacrificial layer. The ink of this Example was printed to create square pyramids with iteratively increasing decreasing slopes and increasingly large overhangs. Self-supporting hollow pyramids were printed by extruding concentric squares. Each square was printed by gradually decreasing the width of the square per layer at a constant layer thickness. This change was calculated to print square pyramids from 90° to 50°. The ink bound well with itself during printing, and its chemical interaction with previously deposited lines of ink below created a binding force greater than that of gravity, allowing for freestanding structures. The fusing of layers during printing allows for printing square pyramids with angles greater than 40 degrees to the vertical. This property is well-suited for biomedical sensors, which require adapting to the curved, sloping topology of the human body and fulfilling complex freestanding geometries.

Example 6. Tactile Sensing Applications of CNT-Silicone Composite

In this example tensile and compressive force responses of sample CNT-silicone composite sensors are evaluated. Tensile and compressive moduli were measured with a texture analyzer. The load was reset before all tests, and force and height were calibrated. The mechanical tests were performed under constant speed and varying strains creating longer testing times for higher strain measurements. Tensile grips were used for all tension measurements. A cylindrical 1 cm$^2$ stainless steel probe was used for most compression measurements, with the following exceptions. A standard circular three-point bending probe was used to produce data in FIG. 25, and a stainless-steel conical probe was used to produce data in FIG. 26. Electrical conductivity measurements were taken with a source meter.

Figure 23:
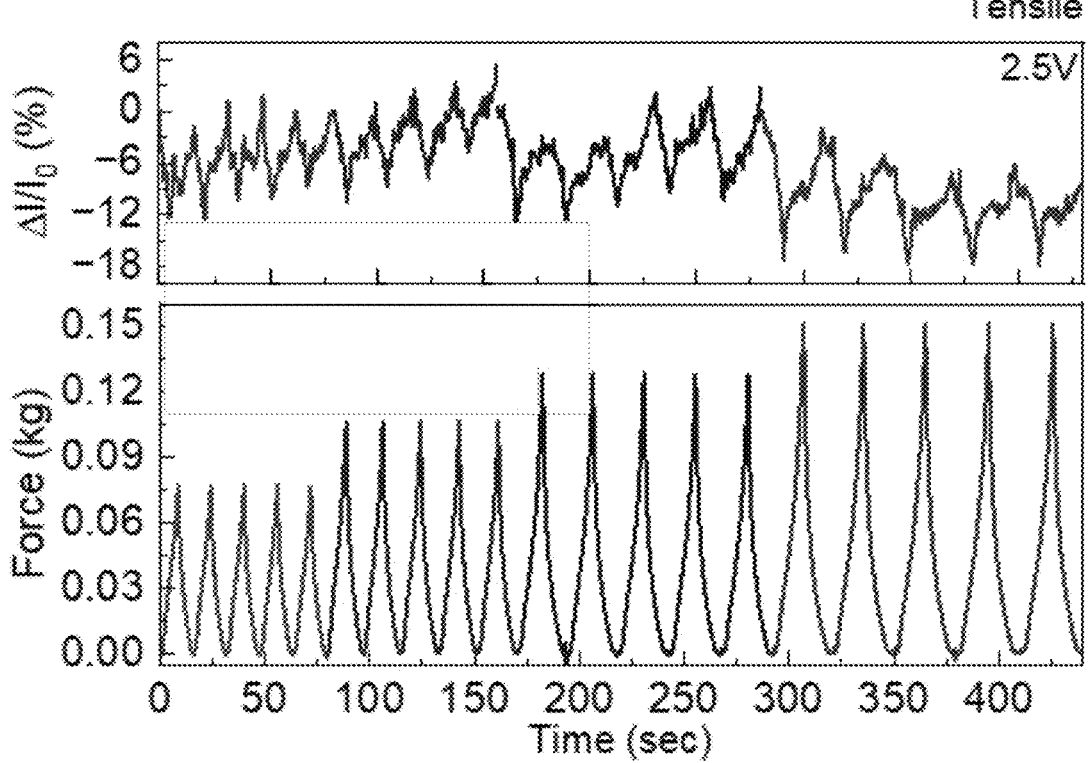
FIG. 23 is a graph showing results of tension cycles on electrical conductivity of a textile sensor.

FIG. 23 is a graph showing results of tension cycles on electrical conductivity of a sensor. Four different levels of force were applied to a single test sensor. FIG. 23 demonstrates the reproducible effect of tension on electrical conductivity. Each level of force was applied for five successive stretch/relaxation cycles. Mechanical strain pulls apart the conductive networks to an extent; this leads to some pathways disconnecting and an increase in resistance, hence a drop in current. When the strain is removed, the pathways reconnect, and the initial resistance is restored. With increasing force, a greater proportion of CNT pathways disconnect and reconnect, leading to proportionally higher change (drop) in current.

Figure 24:
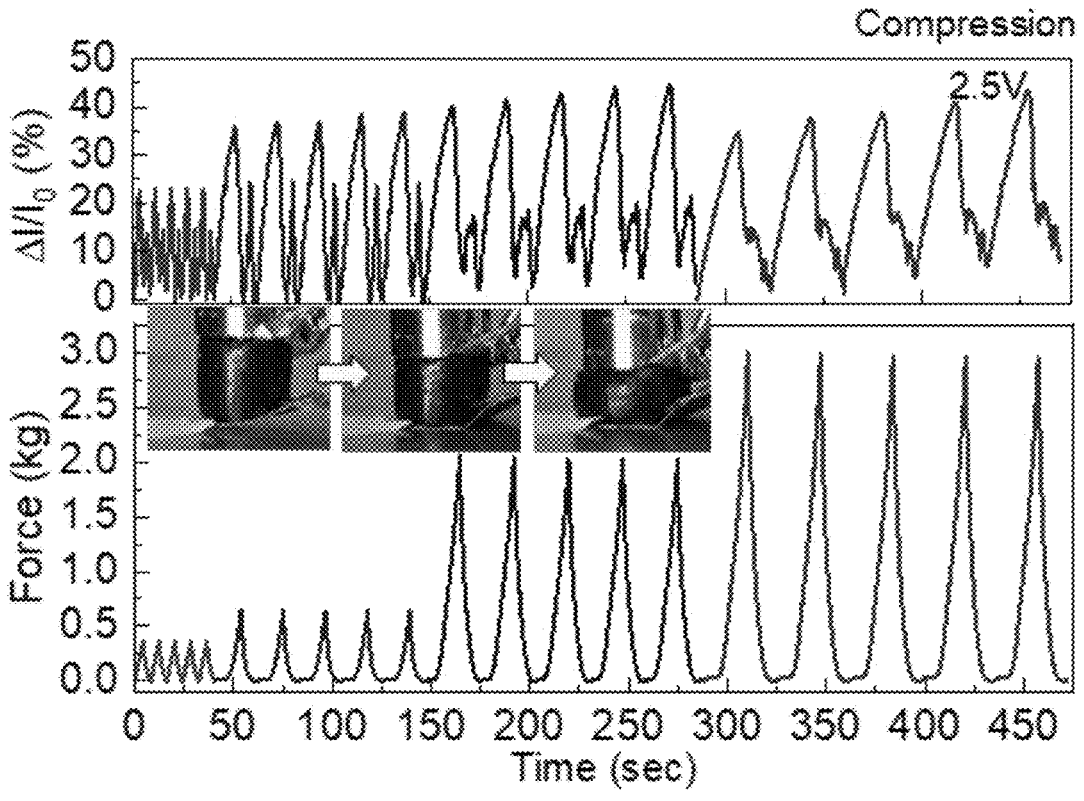
FIG. 24 is a graph showing results of compression cycles on electrical conductivity of a sensor.

FIG. 24 is a graph showing results of compression cycles on electrical conductivity of a sensor. In contrast to tensile forces, compressive forces led to a reversible and proportional increase in current. This result is attributable to the CNT networks becoming denser with more routes for electron flow.

Both tension and compression tests demonstrate viability of using exemplary CNT-silicone composites of this disclosure in motion sensors. For example, an exemplary application is in joint motion sensors, where extension and flexion of muscles, the key to rehabilitation and sports medicine, can be precisely monitored.

Figure 25:
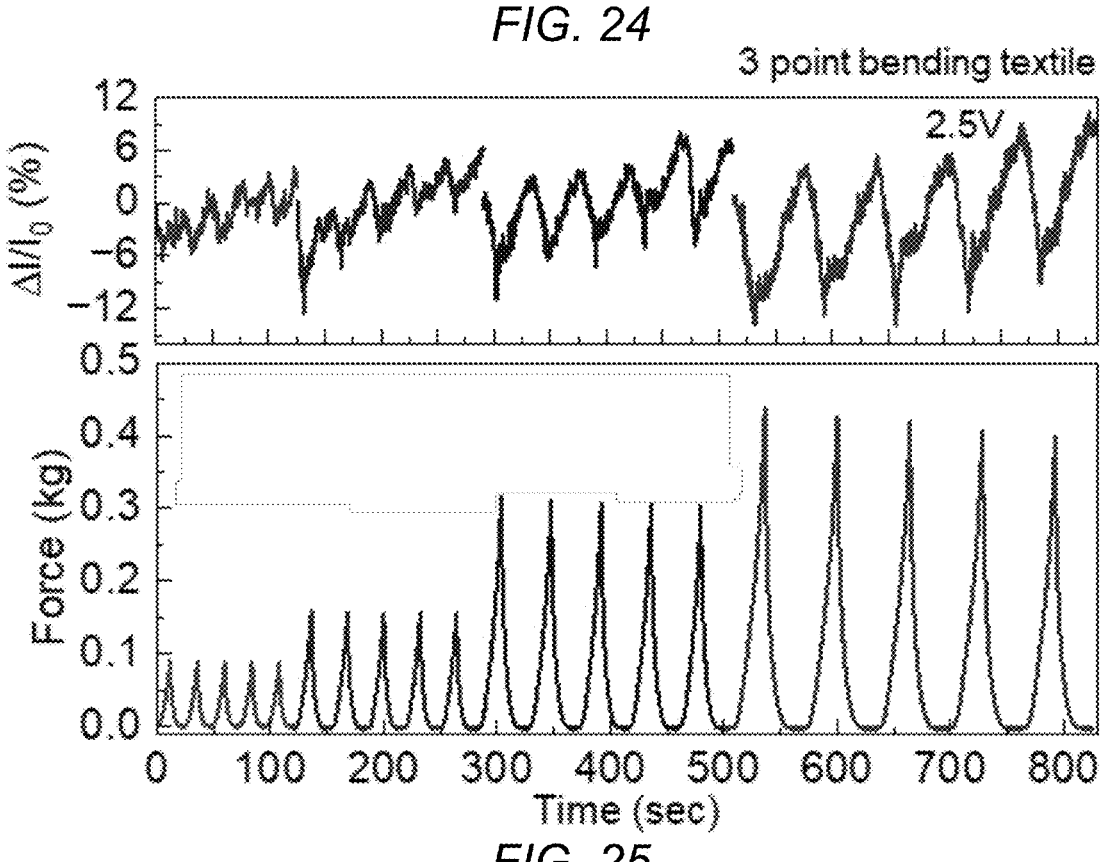
FIG. 25 is a graph of the results of a three-point flexural test performed on the 3D printed stretchable textile sensor.

FIG. 25 is a graph of the results of a three-point flexural test performed on the 3D printed stretchable textile. The setup is analogous to the textile being placed on a human joint. For example, if the joint in question were the elbow joint, a fully extended elbow may correspond with no or negligible stretching of the sensor, while a fully flexed elbow may correspond with maximum extent of stretching of the sensor in the state of use. Larger angles of contraction correspond to increased drops in current. This aligns with the principle of CNT electrical percolation, in which bending of the textile effectively "stretches" the CNT pathways at the curvature points, increasing the length, compressing the cross-sectional area, and increasing resistance. The three-point flexural tests of 3D-printed textiles show how 3D-printed structures respond as well as, if not better than, bulk CNT-silicone samples.

Figure 26:
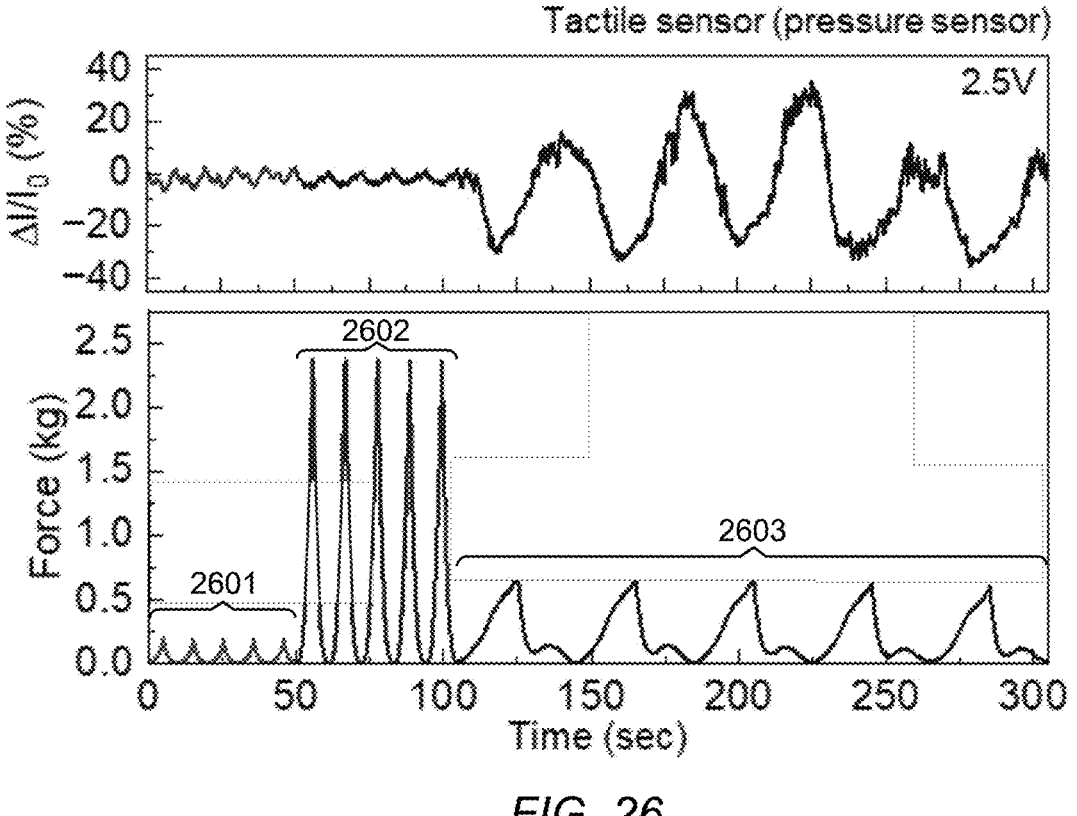
FIG. 26 shows current response to cyclically applied compressive forces from differently shaped probes to a 3D printed device with a fingerprint pattern designed for tactile sensing applications.

FIG. 26 demonstrates compression from differently shaped probes of a 3D printed device with a fingerprint pattern designed for tactile sensing applications. A pointed probe was used for forces 2601. A cylindrical probe was used for forces 2602. A globe shaped probe was used for forces 2603.

The device consists of three layers (from bottom to top): a rubber-like substance of high-performance platinum cure silicone compound (e.g., Dragon Skin™ by Smooth-On™); a high-resolution fingerprint pattern printed with the CNT-silicone ink; an additional layer of the platinum cure silicone compound. This device allows for response to large forces without damaging or directly contacting the ink and is sensitive to tension in all directions, compression in all directions, and flexure.

Though in FIG. 26, the material is being compressed as in FIG. 24, the current decreases through the sample because the direction of current flow is not top to bottom but left to right. Compressing the sample perpendicular to the current direction creates a smaller cross-sectional area for electrons to pass through at the compressed site, increasing resistance and decreasing current.

The different probes used for producing data in FIG. 26 created two pronounced responses. Both a point probe, which compresses only a few hundred square microns of the sample, and a larger cylindrical probe, which compressed ~1 cm$^2$, created a depression in current as expected, but with slightly different responses. The point probe restores its original current upon release comparatively quickly and linearly. In contrast, the larger cylindrical probe, which induced the same current change, restored its initial value more slowly and quadratically.

Figure 27:
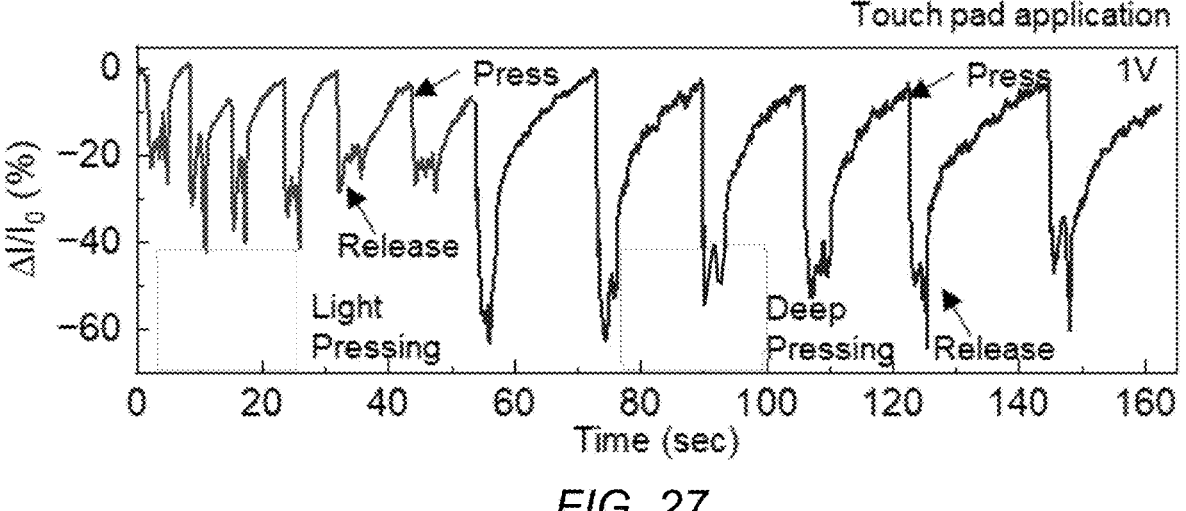
FIG. 27 shows current response for applied forces mimicking a touch pad embodiment.

Three-point bending was investigated in the third section 2603 of FIG. 26 with slower, more pronounced changes in the current, suggesting that the more influential mechanism on resistance change in such a device is tension as opposed to decreasing the already thin cross-sectional area through compression. Similarly, deep pressing reproducibly amplifies the effect (FIG. 27), leading to $\Delta I/I_0$ of $\geq$~60% within four seconds, although more profound touching leads to longer restoration times back to the original current.

These results demonstrate that an exemplary CNT-silicone composite can differentiate between a variety of tactile stimuli useful in electronic skin sensors, including tensile strain, pointed compression, diffuse compression, and flexure. These advantages are desirable in, for example, intelligent prosthetics and touchpad applications. This ability stems from the homogenously dispersed CNT, which responds to stimuli quickly and repeatably at the sensing area.

Example 7. Health Monitoring Applications of 3D Printed Structures

Figure 28:
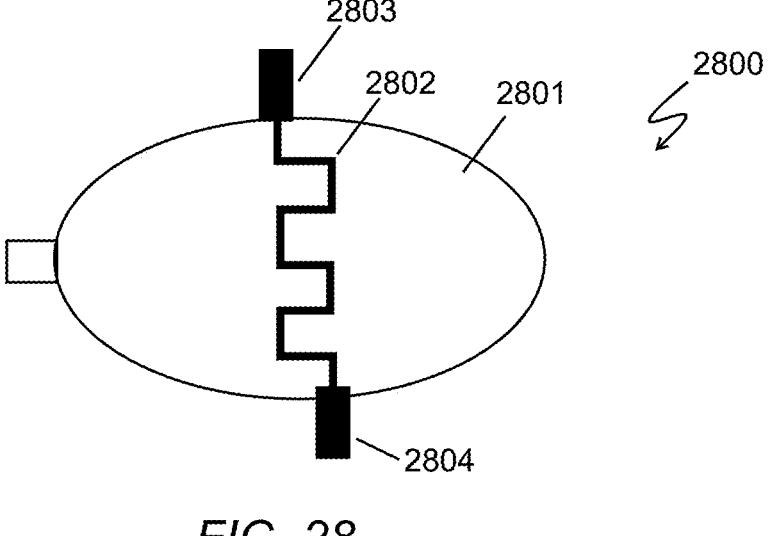
FIG. 28 shows an experimental setup by which a latex balloon mimicked the changing shape of organs while the signal from a CNT-silicone printed pattern sensor was recorded.

This Example further investigates the biosensing applications of exemplary 3D printing ink according to this disclosure. As depicted by FIG. 28, a device 2800 was constructed to model the response of CNT-silicone to the motions of various organs. On a circular latex balloon 2801, a 1.60 mm inner diameter tip was used to print a snake-like pattern 2802, and two copper electrodes 2803 and 2804 were attached to the sides. An air pressure dispensing apparatus (not shown) was attached to the balloon 2801, allowing the pressure to be controlled precisely from 0.1-100 psi. This setup was designed to mimic various motions of the lung and heart. By controlling the rate and quantity of pressure applied, the setup was able to simulate shallow, medium, and deep breaths (lung), as well as tachycardia, bradycardia, and normal sinus rhythm (heart).

Figure 29:
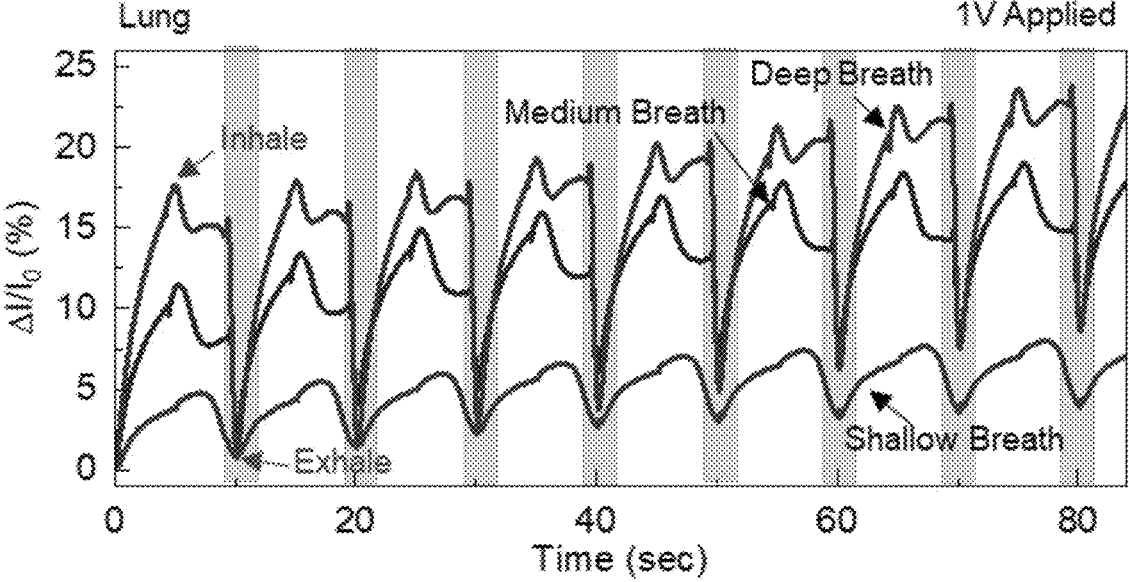
FIG. 29 shows the current signal from the sensor during replication of breathing patterns from the lungs.

The CNT-silicone ink of the printed pattern 2802 could differentiate between various intensities of breaths. The current signal of the pattern 2802 as depicted by connections to the electrodes 2803 and 2804 are depicted in FIG. 29. The cycles were repeatable and reproducible, demonstrating slight hysteresis susceptible to easy correction within programming of the signal processing device (not shown). The amplitudes for the shallow breath were much lower than that of the medium breath, which was lower than that of a deep breath.

Figure 30:
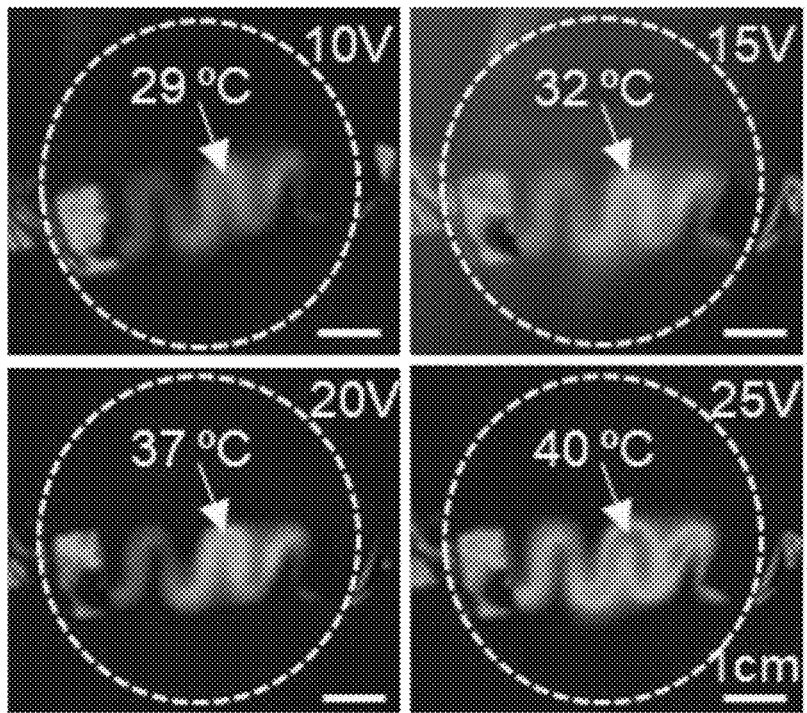
FIG. 30 shows thermal images of the test sensor.

FIG. 30 shows images from a thermal camera which observed the Joules heating on the device 2800. With 20-25 V application, the CNT-silicone device reached 37-40° C. in a few seconds. A wearable device that can undergo Joule heating may be used as a hyperthermia patch to treat cancerous tumors in some cases. In such applications, a material that can conform to the curved surfaces of the skin and can stretch with the movement of the body is highly desirable as a functional joule heating device. Owing to the versatility and mechanical flexibility of the CNT-silicone composite, 3D printed devices according to this disclosure offer a highly customizable, wearable, and implantable subcutaneous devices for treating medical concerns such as but not limited to cancerous tumors.

Figure 31:
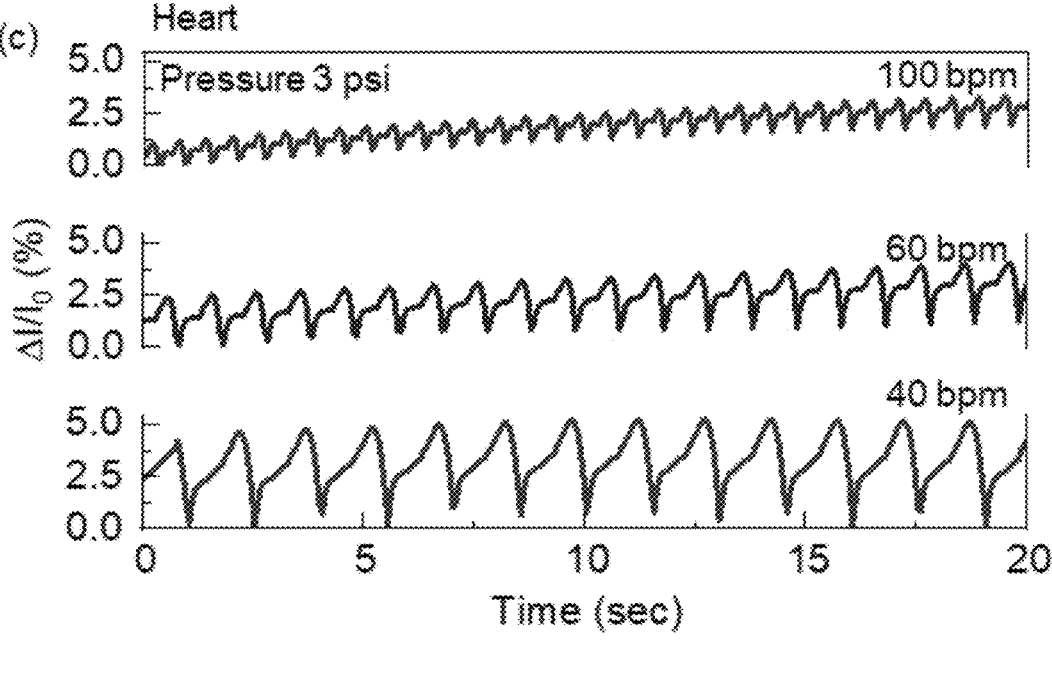
FIG. 31 shows the current signal from the sensor during replication of heartbeat patterns from a heart.

FIG. 31 shows the data collected from the sensor on device 2800 when the device 2800 was simulating a heart rhythm at different rates. The 3D printed CNT-silicone composite proved capable of distinguishing between a fast heart rate and a slow heart rate across dozens of cycles. The response time to the contractions of the balloon was extremely quick—on the order of milliseconds—and the restoration time to the original resistance value was on the millisecond scale as well. The amplitudes of, and the interval between, changes in current remained constant over time.

Figure 32:
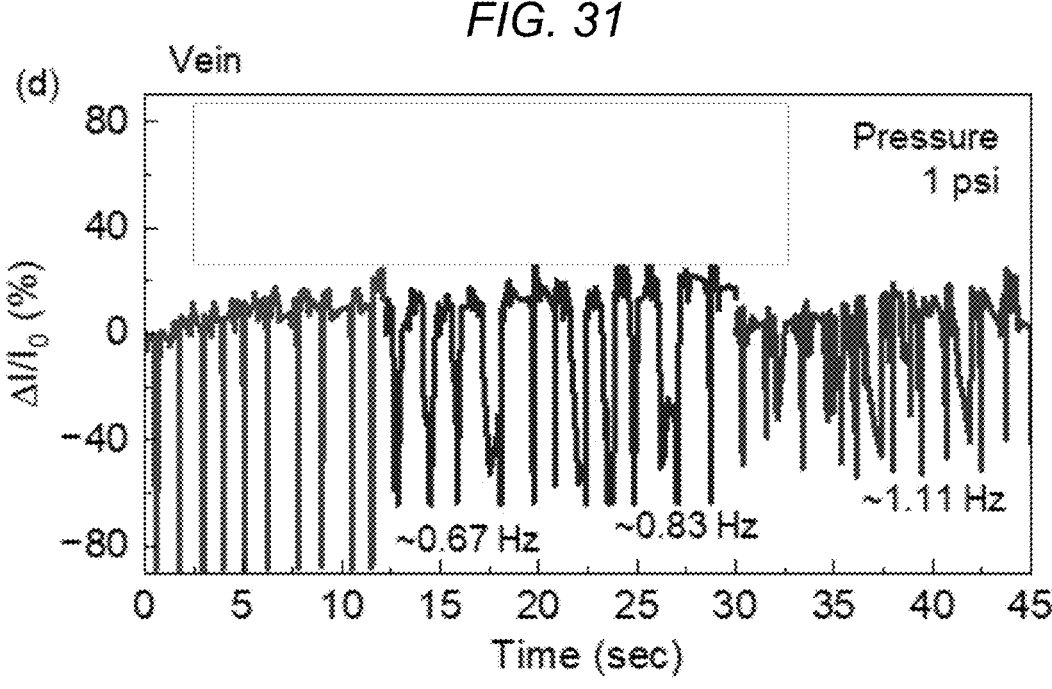
FIG. 32 shows the current signal from the sensor during replication of a vein.

On a long and slender latex balloon (not shown in figures), a similar pattern to pattern 2802 of FIG. 28 was printed parallel to the length of the balloon to mimic blood flow through a vein. Copper electrodes were attached, and the same pressure dispensing apparatus as previously described was attached. By controlling the rate and quantity of pressure applied, the setup simulated hypertension, hypotension, and normal blood pressure. The resulting data is depicted in FIG. 32. High blood pressure generated rapid, dynamic decreases in current; medium blood pressure created slower but more steady decreases in current; low blood pressure generated longer spaced, yet more powerful decreases in current. These observations remarkably correspond to the cardiac physiology of hypertension and hypotension. In hypertension, blood velocity is increased, and the stress on blood vessels increases; this may lead to weaker vibrations of higher frequency, especially if the blood vessels are less flexible due to atherosclerosis, as simulated in FIG. 32, starting at 30 seconds. In hypotension, blood velocity is slower, leading to vibrations of lower frequency, as simulated in FIG. 32 from 0 to 12 seconds. These results indicate a 3D printable conductive, flexible ink according to this disclosure may be used in applications of external health monitoring devices to monitor general cardiac well-being.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Where a range of values is provided in this disclosure, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless otherwise noted, the terms "a" or "an," as used in the specification and claims, are to be construed as meaning "at least one of." In addition, this statement is intended to serve as antecedent basis for use of such exclusive terminology as "solely", "only", and the like in connection with the recitation of claim elements, or use of a "negative" limitation. In addition, for ease of use, the words "including" and "having," as used in the specification and claims, are interchangeable with and have the same meaning as the word "comprising." In addition, the term "based on" as used in the specification and the claims is to be construed as meaning "based at least upon."

While exemplary embodiments of the present invention have been disclosed herein, one skilled in the art will recognize that various changes and modifications may be made without departing from the scope of the invention as defined by the following claims.

What is claimed is:

1. An ink precursor, comprising uncured one-part room temperature vulcanized (RTV) silicone and carbon particles dissolved in butyl acetate (BA).

2. The ink precursor of claim 1, wherein the carbon particles are carbon nanotubes (CNT).

3. The ink precursor of claim 2, wherein the RTV silicone and CNT are a homogeneous dispersion.

4. The ink precursor of claim 1, further comprising a viscosity reducer.

5. The ink precursor of claim 4, wherein the viscosity reducer is methyl-terminated polydimethylsiloxane (MEP).

6. The ink precursor of claim 1, wherein the ink precursor has at least 50:100% w/w ratio of BA:silicone.

7. An ink for 3D printing, comprising a homogenous mixture of uncured one-part room temperature vulcanized (RTV) silicone and carbon particles.

8. The ink of claim 7, wherein the carbon particles are carbon nanotubes (CNT).

9. The ink of claim 7, wherein the ink is solvent free.

10. The ink of claim 7, further comprising a viscosity reducer.

11. The ink of claim 10, wherein the viscosity reducer is methyl-terminated polydimethylsiloxane (MEP).

12. The ink of claim 11, wherein the ink has at most a 15:100% w/w ratio of MEP:silicone.

13. The ink of claim 7, wherein the one-part RTV silicone is polydimethylsiloxane (PDMS).

14. The ink of claim 7, wherein the ink has a working time greater than 30 minutes.

15. The ink of claim 7, wherein the ink has a working time over two hours.

16. The ink of claim 7, wherein the ink has a printing resolution of at least 100 μm.

\* \* \* \* \*